US009576288B1

(12) United States Patent
Jesensky et al.

(10) Patent No.: US 9,576,288 B1
(45) Date of Patent: *Feb. 21, 2017

(54) AUTOMATIC APPROVAL

(71) Applicant: Amazon Technologies, Inc., Reno, NV (US)

(72) Inventors: James Jesensky, Bellevue, WA (US); Isaac Oates, Seattle, WA (US); Amit D. Agarwal, Mercer Island, WA (US); Vinay P. Vaidya, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 450 days.

This patent is subject to a terminal disclaimer.

(21) Appl. No.: 14/336,258

(22) Filed: Jul. 21, 2014

Related U.S. Application Data

(63) Continuation of application No. 12/165,102, filed on Jun. 30, 2008, now Pat. No. 8,788,945.

(51) Int. Cl.
G06Q 20/40 (2012.01)

(52) U.S. Cl.
CPC .................... G06Q 20/40 (2013.01)

(58) Field of Classification Search
CPC ....................................................... G06Q 20/40
See application file for complete search history.

(56) References Cited

U.S. PATENT DOCUMENTS

| | | |
|---|---|---|
| 5,890,137 A | 3/1999 | Koreeda |
| 5,953,710 A | 9/1999 | Fleming |
| 6,332,131 B1 | 12/2001 | Grandcolas et al. |
| 6,360,254 B1 | 3/2002 | Linden et al. |
| 6,484,182 B1 | 11/2002 | Dunphy et al. |
| 6,636,242 B2 | 10/2003 | Bowman-Amuah |
| 6,658,568 B1 | 12/2003 | Ginter et al. |
| 6,661,431 B1 | 12/2003 | Stuart et al. |
| 6,853,987 B1 | 2/2005 | Cook |
| 6,856,966 B1 | 2/2005 | Fujimoto |
| 6,868,395 B1 | 3/2005 | Szlam et al. |
| 6,961,858 B2 | 11/2005 | Fransdonk |
| 6,980,960 B2 | 12/2005 | Hajdukiewicz et al. |
| 6,988,657 B1 | 1/2006 | Singer et al. |
| 7,020,635 B2 | 3/2006 | Hamilton et al. |
| 7,058,718 B2 | 6/2006 | Fontes et al. |
| 7,073,129 B1 | 7/2006 | Robarts et al. |
| 7,080,049 B2 | 7/2006 | Truitt et al. |

(Continued)

FOREIGN PATENT DOCUMENTS

FR 2829647 3/2003

OTHER PUBLICATIONS

Final Office Action for U.S. Appl. No. 12/544,940, mailed on May 19, 2015, Matthew T. Williams, "Providing Localized Delivery Information Without Authentication", 16 pages.

(Continued)

*Primary Examiner* — Jung-Mu Chuang
(74) *Attorney, Agent, or Firm* — Lee & Hayes, PLLC

(57) ABSTRACT

Techniques for automatically approving transactions are described herein. These techniques may include determining whether a user who requested to conduct a transaction is the same user as a user that approves the transaction. If so, then the transaction may be approved. If not, then the approving user may be asked to provide authentication information in order to finish the approval process.

19 Claims, 16 Drawing Sheets

(56) References Cited

U.S. PATENT DOCUMENTS

| | | |
|---|---|---|
| 7,089,497 B2 | 8/2006 | Abbott et al. |
| 7,090,128 B2 | 8/2006 | Farley et al. |
| 7,107,226 B1 | 9/2006 | Cassidy et al. |
| 7,107,462 B2 | 9/2006 | Fransdonk |
| 7,117,165 B1 | 10/2006 | Adams et al. |
| 7,136,841 B2 | 11/2006 | Cook |
| 7,150,045 B2 | 12/2006 | Koelle et al. |
| 7,185,010 B2 | 2/2007 | Morinville |
| 7,225,156 B2 | 5/2007 | Fisher et al. |
| 7,319,986 B2 | 1/2008 | Praisner et al. |
| 7,324,968 B2 | 1/2008 | Rotman et al. |
| 7,379,921 B1 | 5/2008 | Kiliccote |
| 7,383,231 B2 | 6/2008 | Gupta et al. |
| 7,434,723 B1 | 10/2008 | White et al. |
| 7,478,331 B2 | 1/2009 | Abbott et al. |
| 7,496,849 B2 | 2/2009 | Abbott et al. |
| 7,552,365 B1 | 6/2009 | Marsh et al. |
| 7,580,699 B1 | 8/2009 | Shaw et al. |
| 7,587,502 B2 | 9/2009 | Crawford et al. |
| 7,599,856 B2 * | 10/2009 | Agrawal ............... G06Q 20/00 705/26.8 |
| 7,676,407 B2 | 3/2010 | Van De Van et al. |
| 7,685,013 B2 | 3/2010 | Gendler |
| 7,711,586 B2 | 5/2010 | Aggarwal et al. |
| 7,729,994 B2 | 6/2010 | Gupta et al. |
| 7,748,614 B2 | 7/2010 | Brown |
| 7,809,819 B2 | 10/2010 | DeLima et al. |
| 7,827,101 B2 | 11/2010 | Mascavage, III |
| 7,917,160 B2 | 3/2011 | Choe et al. |
| 8,027,918 B2 | 9/2011 | Nielsen et al. |
| 8,046,256 B2 | 10/2011 | Chien et al. |
| 8,150,768 B2 | 4/2012 | Gupta et al. |
| 8,249,988 B2 | 8/2012 | Teicher |
| 8,271,395 B2 * | 9/2012 | Dominguez ........... G06Q 20/02 705/65 |
| 8,389,140 B2 * | 3/2013 | Yu ....................... G06Q 20/045 343/702 |
| 8,636,206 B2 | 1/2014 | Rothwell et al. |
| 8,706,631 B2 * | 4/2014 | Gupta ................. G06Q 30/0601 455/406 |
| 9,059,643 B2 * | 6/2015 | Haddad ............... H02M 3/1584 |
| 9,123,069 B1 | 9/2015 | Haynes et al. |
| 2001/0034724 A1 | 10/2001 | Thieme |
| 2001/0044756 A1 | 11/2001 | Watkins et al. |
| 2002/0007351 A1 | 1/2002 | Hillegass et al. |
| 2002/0032605 A1 | 3/2002 | Lee |
| 2002/0046169 A1 | 4/2002 | Keresman, III et al. |
| 2002/0046191 A1 | 4/2002 | Joao |
| 2002/0087477 A1 | 7/2002 | Mantena et al. |
| 2002/0103752 A1 | 8/2002 | Berger et al. |
| 2002/0112171 A1 | 8/2002 | Ginter et al. |
| 2002/0120567 A1 * | 8/2002 | Caplan ................ G07F 17/0014 705/40 |
| 2002/0138366 A1 | 9/2002 | Skantze |
| 2002/0174030 A1 | 11/2002 | Praisner et al. |
| 2002/0175517 A1 | 11/2002 | Anderson |
| 2002/0194138 A1 * | 12/2002 | Dominguez ........... G06Q 20/02 705/64 |
| 2003/0004831 A1 | 1/2003 | Owens |
| 2003/0046172 A1 | 3/2003 | Himmel et al. |
| 2003/0061170 A1 | 3/2003 | Uzo |
| 2003/0083983 A1 | 5/2003 | Fisher et al. |
| 2003/0105682 A1 | 6/2003 | Dicker et al. |
| 2003/0126018 A1 | 7/2003 | LaMotta et al. |
| 2003/0126094 A1 | 7/2003 | Fisher et al. |
| 2003/0135625 A1 | 7/2003 | Fontes et al. |
| 2003/0139971 A1 | 7/2003 | Rescigno et al. |
| 2003/0173407 A1 | 9/2003 | Raadsen |
| 2003/0220875 A1 | 11/2003 | Lam et al. |
| 2004/0111370 A1 | 6/2004 | Saylors et al. |
| 2004/0128211 A1 | 7/2004 | Tsai |
| 2004/0143547 A1 | 7/2004 | Mersky |
| 2004/0198308 A1 * | 10/2004 | Hurst .................... G06F 21/10 455/403 |
| 2004/0225606 A1 * | 11/2004 | Nguyen ................. G06Q 20/04 705/40 |
| 2004/0267672 A1 | 12/2004 | Gray et al. |
| 2005/0027639 A1 | 2/2005 | Wong |
| 2005/0097037 A1 | 5/2005 | Tibor |
| 2005/0108153 A1 * | 5/2005 | Thomas ................ G06Q 20/00 705/39 |
| 2005/0114666 A1 * | 5/2005 | Sudia .................... H04L 9/3236 713/175 |
| 2005/0125317 A1 | 6/2005 | Winkelman et al. |
| 2005/0149439 A1 | 7/2005 | Suisa |
| 2005/0154744 A1 | 7/2005 | Morinville |
| 2005/0166265 A1 | 7/2005 | Satomi |
| 2005/0167489 A1 | 8/2005 | Barton et al. |
| 2005/0198534 A1 | 9/2005 | Matta et al. |
| 2005/0240493 A1 | 10/2005 | Johnson et al. |
| 2005/0251447 A1 | 11/2005 | Lane |
| 2005/0278222 A1 | 12/2005 | Nortrup |
| 2005/0278263 A1 | 12/2005 | Hollander et al. |
| 2006/0015458 A1 | 1/2006 | Teicher |
| 2006/0015463 A1 | 1/2006 | Gupta et al. |
| 2006/0069654 A1 | 3/2006 | Beach et al. |
| 2006/0080238 A1 | 4/2006 | Nielsen et al. |
| 2006/0111967 A1 | 5/2006 | Forbes |
| 2006/0136309 A1 | 6/2006 | Horn et al. |
| 2006/0212392 A1 | 9/2006 | Brown |
| 2006/0212393 A1 | 9/2006 | Lindsay Brown |
| 2006/0213983 A1 | 9/2006 | Walker et al. |
| 2006/0219776 A1 | 10/2006 | Finn |
| 2006/0248452 A1 | 11/2006 | Lambert et al. |
| 2006/0265489 A1 | 11/2006 | Moore |
| 2006/0271476 A1 | 11/2006 | Thompson |
| 2006/0277474 A1 | 12/2006 | Robarts et al. |
| 2007/0005495 A1 | 1/2007 | Kim |
| 2007/0073630 A1 * | 3/2007 | Greene ................. G06Q 20/40 705/80 |
| 2007/0078760 A1 | 4/2007 | Conaty et al. |
| 2007/0083433 A1 | 4/2007 | Lawe |
| 2007/0106606 A1 | 5/2007 | Pankratz et al. |
| 2007/0150299 A1 * | 6/2007 | Flory ..................... G06Q 10/10 705/51 |
| 2007/0157110 A1 | 7/2007 | Gandhi et al. |
| 2007/0158413 A1 | 7/2007 | Hastie |
| 2007/0179790 A1 | 8/2007 | Leitch et al. |
| 2007/0192245 A1 | 8/2007 | Fisher et al. |
| 2007/0198432 A1 | 8/2007 | Pitroda et al. |
| 2007/0226084 A1 | 9/2007 | Cowles |
| 2007/0233579 A1 | 10/2007 | Saarinen et al. |
| 2007/0283273 A1 | 12/2007 | Woods |
| 2007/0288364 A1 | 12/2007 | Gendler |
| 2007/0288370 A1 | 12/2007 | Konja |
| 2007/0299736 A1 * | 12/2007 | Perrochon .......... G06Q 30/0603 705/26.41 |
| 2008/0015927 A1 | 1/2008 | Ramirez |
| 2008/0033878 A1 | 2/2008 | Krikorian et al. |
| 2008/0052226 A1 | 2/2008 | Agarwal et al. |
| 2008/0052343 A1 | 2/2008 | Wood |
| 2008/0097933 A1 | 4/2008 | Awaida et al. |
| 2008/0114709 A1 | 5/2008 | Dixon et al. |
| 2008/0134043 A1 | 6/2008 | Georgis et al. |
| 2008/0140524 A1 | 6/2008 | Anand et al. |
| 2008/0140564 A1 * | 6/2008 | Tal ......................... G06Q 20/02 705/39 |
| 2008/0147506 A1 | 6/2008 | Ling |
| 2008/0168543 A1 | 7/2008 | von Krogh |
| 2008/0168544 A1 | 7/2008 | von Krogh |
| 2008/0172270 A1 | 7/2008 | Eckenroth |
| 2008/0177663 A1 | 7/2008 | Gupta et al. |
| 2008/0183574 A1 | 7/2008 | Nash et al. |
| 2008/0183757 A1 | 7/2008 | Dorogusker et al. |
| 2008/0189186 A1 | 8/2008 | Choi et al. |
| 2008/0195506 A1 | 8/2008 | Koretz et al. |
| 2008/0201643 A1 | 8/2008 | Nagaitis et al. |
| 2008/0208747 A1 | 8/2008 | Papismedov et al. |
| 2008/0221987 A1 | 9/2008 | Sundaresan et al. |
| 2008/0270293 A1 | 10/2008 | Fortune et al. |
| 2008/0275777 A1 | 11/2008 | Protheroe et al. |
| 2008/0320147 A1 | 12/2008 | DeLima et al. |
| 2009/0006995 A1 | 1/2009 | Error et al. |

(56) References Cited

U.S. PATENT DOCUMENTS

| | | | |
|---|---|---|---|
| 2009/0024469 | A1 | 1/2009 | Broder et al. |
| 2009/0037294 | A1 | 2/2009 | Malhotra |
| 2009/0132969 | A1 | 5/2009 | Mayer |
| 2009/0138379 | A1 | 5/2009 | Scheman |
| 2009/0164442 | A1 | 6/2009 | Shani et al. |
| 2009/0172551 | A1 | 7/2009 | Kane et al. |
| 2009/0241015 | A1* | 9/2009 | Bender ............ G06F 17/30038 715/202 |
| 2009/0248467 | A1 | 10/2009 | Bulman et al. |
| 2009/0259559 | A1 | 10/2009 | Carroll et al. |
| 2009/0259574 | A1 | 10/2009 | Thomsen et al. |
| 2009/0307134 | A1 | 12/2009 | Gupta et al. |
| 2010/0049766 | A1 | 2/2010 | Sweeney et al. |
| 2010/0121734 | A1 | 5/2010 | Harper et al. |
| 2010/0138297 | A1 | 6/2010 | Fitzgerald et al. |
| 2010/0197380 | A1 | 8/2010 | Shackleton |
| 2010/0293048 | A1 | 11/2010 | Singolda et al. |
| 2010/0299731 | A1 | 11/2010 | Atkinson |
| 2010/0306078 | A1 | 12/2010 | Hwang |
| 2011/0035289 | A1 | 2/2011 | King et al. |
| 2011/0060629 | A1 | 3/2011 | Yoder et al. |
| 2011/0117935 | A1 | 5/2011 | Cho et al. |
| 2012/0316992 | A1 | 12/2012 | Oborne |
| 2013/0074168 | A1 | 3/2013 | Hao et al. |
| 2013/0136242 | A1 | 5/2013 | Ross et al. |
| 2013/0198084 | A1 | 8/2013 | Agarwal et al. |
| 2014/0281853 | A1* | 9/2014 | Bender ............ G06F 17/30038 715/202 |

OTHER PUBLICATIONS

U.S. Appl. No. 11/771,679, filed Jun. 29, 2007, Maynard-Zhang, et al., "Mapping Attributes to Network Addresses."
Apache HBase, Chapter 8 Architecture, retrieved from <<http://hbase.apache.org/book.html#architecture>>, available as early as Nov. 30, 2011, Apache Software Foundation, 8 pages.
Chang et al, "Bigtable: A Distributed Storage System for Structured Data," 7th USENIX Symposium on Operating Systems Design and Implementation, OSDI '06, Nov. 2006, 14 pages.
Fielding et al, "Hypertext Transfer Protocol—HTTP/1.1", Network Working Group, W3C/MIT, Jun. 1999, http://tools.ietf.org/pdf/rfc2616.pdf, 114 pages.
Final Office Action for U.S. Appl. No. 12/165,102, mailed on Nov. 8, 2013, James Jesensky, "Automatic Approval", 37 pages.
Howstuffworks, "What is a packet?", http//web.archive.org/web/20060708154355/http://computer.howstuffworks.com/question525.htm, last retrieved Sep. 1, 2011, 2 pages.
Kessler, "Passwords-Streghts and Weaknesses", retrived at <<http://www.garykessler.net/library/password.html>>, 1996, pp. 1-pp. 7.
Office action for U.S. Appl. No. 12/165,102, mailed on Apr. 1, 2011, Jesensky, James, "Automatic Approval".
Office action for U.S. Appl. No. 12/165,081, mailed on Oct. 17, 2012, Agarwal et al., "Conducting Transactions with Dynamic Passwords", 25 pages.
Final Office Action for U.S. Appl. No. 12/035,618, mailed on Oct. 22, 2012, Michal Bryc et al., "Automated Targeting of Content Components", 39 pages.
Office action for U.S. Appl. No. 12/165,102, mailed on Nov. 9, 2012, Jesensky et al., "Automatic Approval", 36 pages.
Office Action for U.S. Appl. No. 12/165,081, mailed on Nov. 20, 2013, Amit Agarwal, "Conducting Transactions with Dynamic Passwords", 25 pages.
Final Office Action for U.S. Appl. No. 12/147,876, mailed on May 6, 2011, Isaac Oates et al., "Providing Information Without Authentication", 11 pages.
Non-Final Office Action for U.S. Appl. No. 12/165,102, mailed on Mar. 8, 2012, James Jesensky et al., "Automatic Approval", 31 pages.
Non-Final Office Action for U.S. Appl. No. 12/035,618, mailed on Apr. 14, 2012, Michal Bryc et al., "Automated Targeting of Content Components", 31 pages.
Office action for U.S. Appl. No. 12/165,102, mailed on May 17, 2013, Jesensky et al, "Automatic Approval", 42 pages.
Non-Final Office Action for U.S. Appl. No. 12/147,876, mailed on May 6, 2011, Isaac Oates, "Providing Information Without Authentication".
Office Action for U.S. Appl. No. 12/544,940, mailed on Jun. 11, 2014, Matthew T. Williams, "Providing Localized Delivery Information Without Authentication", 15 pages.
Non-Final Office Action for U.S. Appl. No. 12/165,081, mailed on Jun. 4, 2012, Amit Agarwal et al., "Conducting Transactions with Dynamic Passwords", 23 pages.
Non-Final Office Action for U.S. Appl. No. 12/165,102, mailed on Jul. 3, 2012, Jesensky James et al., "Automatic Approval", 30 pages.
Final Office Action for U.S. Appl. No. 12/035,618, mailed on Aug. 2, 2011, Michal Bryc, "Automated Targeting of Content Components".
Final Office Action for U.S. Appl. No. 12/165,102, mailed on Sep. 13, 2011, James Jesensky, "Automatic Approval", 31 pages.
"PayPal Security Key", retrieved on Jun. 19, 2008 at <<https://www.paypal.com/securitykey>>, PayPal (2 pages).
Quova, retrieved on May 29, 2009 at <<http://www.quova.com/>>, Quova Inc., USA, 5 pgs.
Wikipedia, HTTP cookie, "http://web.archive.org/web/20080227064831/http://en.wikipedia.org/wiki/HTTP_cookie", last retrieved Sep. 1, 2011, 18 pages.
Wikipedia, MSISDN, http://web/archive.org/web/20071029015418/http://en.wikipeida.org/wiki/MSISDN, last retrieved Sep. 1, 2011, 3 pages.
Final Office Action for U.S. Appl. No. 12/165,081, mailed on Nov. 14, 2014, Amit Agarwal, "Conducting Transactions with Dynamic Passwords", 8 pages.
Office Action for U.S. Appl. No. 12/544,940, mailed on Nov. 17, 2014, Matthew T. Williams, "Providing Localized Delivery Information Without Authentication", 15 pages.
Office action for U.S. Appl. No. 12/165,081 mailed on Nov. 18, 2015, Agarwal et al., "Conducting Transactions with Dynamic Passwords", 18 pages.
Office action for U.S. Appl. No. 12/147,876, mailed on Sep. 24, 2015, Oates et al., "Providing Information Without Authentication", 19 pages.
Office action for U.S. Appl. No. 12/165,081, mailed on Jul. 25, 2014, Agarwal et al., "Conducting Transactions with Dynamic Passwords", 8 pages.
Office action for U.S. Appl. No. 12/544,940, mailed on Mar. 24, 2016, Williams et al., "Providing Localized Delivery Information Without Authentication", 10 pages.
Office action for U.S. Appl. No. 12/147,876, mailed on Apr. 15, 2016, Oates et al., "Providing Information Without Authentication", 18 pages.

* cited by examiner

AUTOMATIC APPROVAL

RELATED APPLICATIONS

The present application is a continuation of and claims priority to U.S. patent application Ser. No. 12/165,102 filed on Jun. 30, 2008, entitled "Automatic Approval", which is incorporated by reference herein in its entirety.

BACKGROUND

Companies utilizing e-commerce sites strive to make their sites easier for users to locate and purchase items. To help users locate items, for instance, these sites may categorize products into varying categories of an electronic catalog. In order to ease users' ability to purchase items, meanwhile, these companies may configure their sites to accept many forms of payment. While many of these strategies have increased the effectiveness of these sites, companies continually strive to further enhance user experiences.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
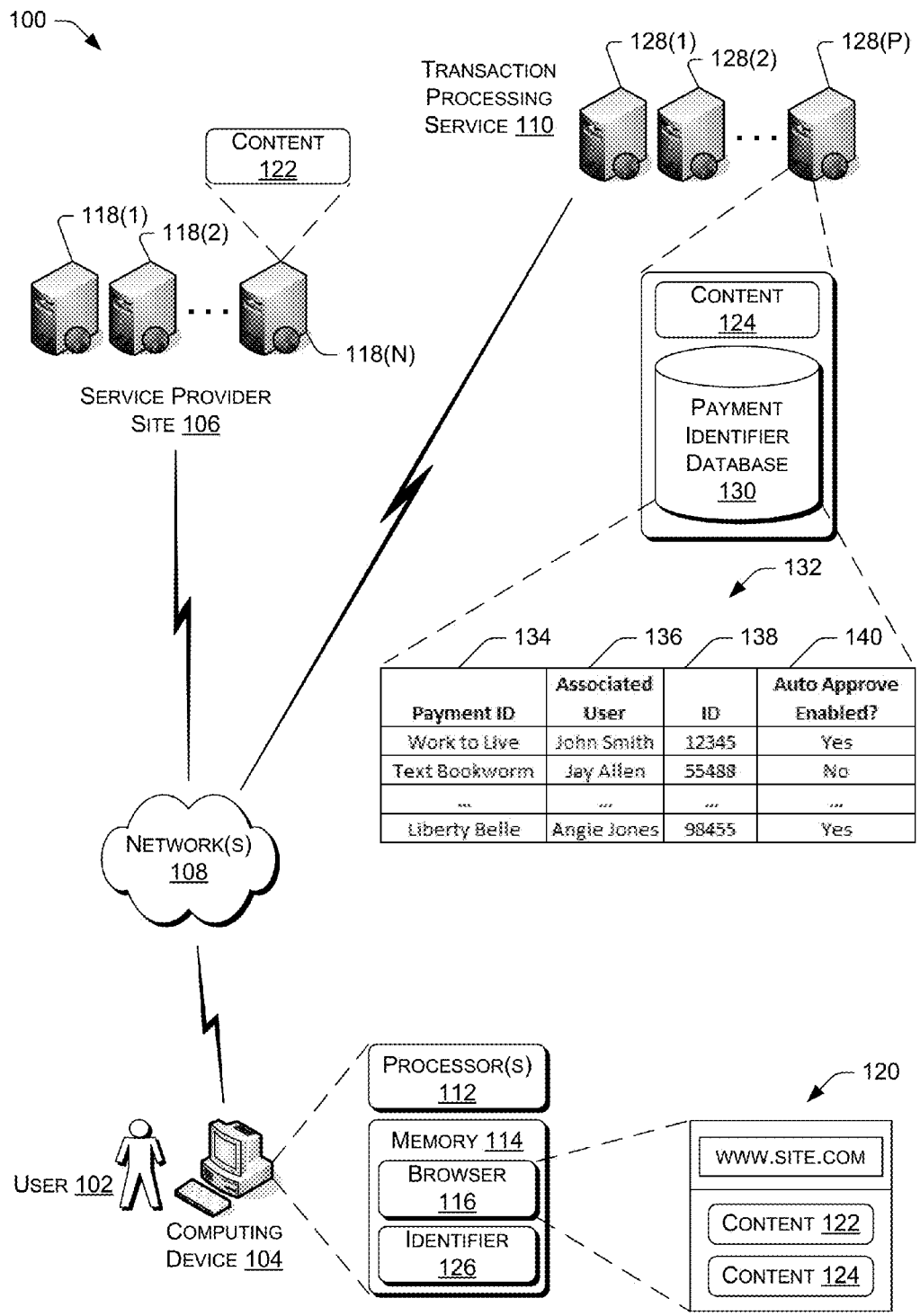
FIG. 1 illustrates an example architecture for implementing automatic approval or for otherwise comparing identifications of a device with a stored identification. This example architecture illustrates a user operating a computing device to access a site of a service provider to engage in a transaction with the provider. The service provider may leverage a transaction processing service to automatically approve the transaction without asking the user to provide authentication information by, for example, signing into his or her account with the processing service.

This disclosure is directed to, in part, automatically approving a requested transaction without requiring the user to provide authentication information. For example, the requested transaction may be automatically approved without requiring the user to sign in to his or her account. This disclosure also relates to determining whether a user who interacts with content is operating the same device as a device that originally requested the content. If this is determined to be true, then in some instances one may assume that the user who interacts with the content is the same user that originally requested the content.

For example, a user may operate a computing device to request content from a content provider for rendering on a display or other output of the device. At or near the time of the request for the content, the device may provide an identifier of the device to the content provider. In response, the content provider may serve the requested content to the requesting device. Thereafter, the user may select a link or may otherwise interact with the content.

Using the example of the link selection, this user selection may result in another request being sent back to the content provider or another entity. At or near the time of this second request or communication, the device may again send some sort of identifier back to the content provider or other entity.

Having received both identifiers, the content provider or the other entity may determine whether or not the device that made the original request is the same device as the device that selected the link or otherwise interacted with the content. The content provider or the other entity may use this information for an array of purposes. For instance, the content provider may automatically approve a pending transaction if the identifiers match one another (and potentially if one or more other criteria are satisfied). Furthermore, the content provider may merely log the information or provide the information to another entity. This other entity may then track and/or leverage this information in many ways, including for business purposes, statistical purposes, and the like.

The discussion begins with a section entitled "Illustrative Architecture", which describes one non-limiting environment that may implement the claimed techniques. A section entitled "Illustrative User Interfaces" follows. This section depicts and describes illustrative examples of user interfaces (UIs) that may be served to and rendered at the device of the user of FIG. 1. A third section, entitled "Illustrative Flow Diagrams", depicts and describes how automatic approval and other techniques may be employed in the illustrative architecture of FIG. 1, as well as other architectures. Finally, a section entitled "Illustrative Processes" concludes the discussion.

This brief introduction, including section titles and corresponding summaries, is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Illustrative Architecture

FIG. 1 illustrates an example architecture 100 in which automatic approval and other claimed techniques may be implemented. Here, the techniques are described in the context of a user 102 operating a computing device 104 to access a service provider site 106 over a network 108. For instance, user 102 may employ device 104 to access site 106 for purposes of engaging in a transaction with the service provider. Architecture 100 also includes a transaction processing service 110 configured to manage the requested transaction. While service provider site 106 and transaction processing service 110 are illustrated in the current example as separate entities, it is to be appreciated that the service provider and processing service 110 may comprise the same entity or may employ similar or the same functionality in other embodiments. Furthermore, it is to be appreciated that the described techniques themselves may be implemented in a vast number of other environments and architectures.

In architecture 100, site 106 may comprise any sort of site that supports user interaction, including social networking sites, e-commerce sites, informational sites, news and entertainment sites, and so forth. Additionally, the site is representative of proprietary sites that receive requests and provide content over proprietary networks other than the Internet and public web.

Furthermore, while the illustrated example represents user 102 accessing service provider site 106, the described techniques may equally apply in instances where user 102 interacts with the service provider over the phone, via a kiosk, or in any other manner. It is also noted that the described techniques may apply in other client/server arrangements, as well as in non-client/server arrangements (e.g., locally-stored software applications, set-top boxes, etc.).

Here, user 102 accesses content site 106 via network 108. Network 108 may include any one or combination of multiple different types of networks, such as cable networks, the Internet, and wireless networks. User computing device 104, meanwhile, may be implemented as any number of computing devices, including as a personal computer, a laptop computer, a portable digital assistant (PDA), a cell phone, a set-top box, a game console, a personal media player (PMP), and so forth. User computing device 104 is equipped with one or more processors 112 and memory 114 to store applications and data. An application, such as browser 116 or other client application, running on device 104 facilitates access to site 106 over network 108.

Site 106 is hosted on one or more servers 118(1), . . . , 118(N) having processing and storage capabilities. In one implementation, the servers might be arranged in a cluster or as a server farm, although other server architectures may also be used to host the site. The site is capable of handling requests from many users and serving, in response, various pages of content that can be rendered at user computing device 104 for viewing by user 102. For instance and as illustrated, site 106 may serve a page 120 to computing device 104. Page 120 may comprise any sort of content, such as an item for sale, a user profile, a search page, a discussion forum, and/or any other type of page.

In the illustrated example, page 120 comprises content 122 served by service provider site 106, as well as content 124 served by transaction processing service 110. Here, content 122 and 124 may comprise any sort of content capable of being visually, audibly, or otherwise consumed by user 102. In instances where the service provider that hosts site 106 comprises an e-commerce site, content 122 may comprise one or more items for consumption by user 102. For example, this content may comprise an item for sale, rent, download, viewing, listening, or for any other type of consumption.

Figure 2:
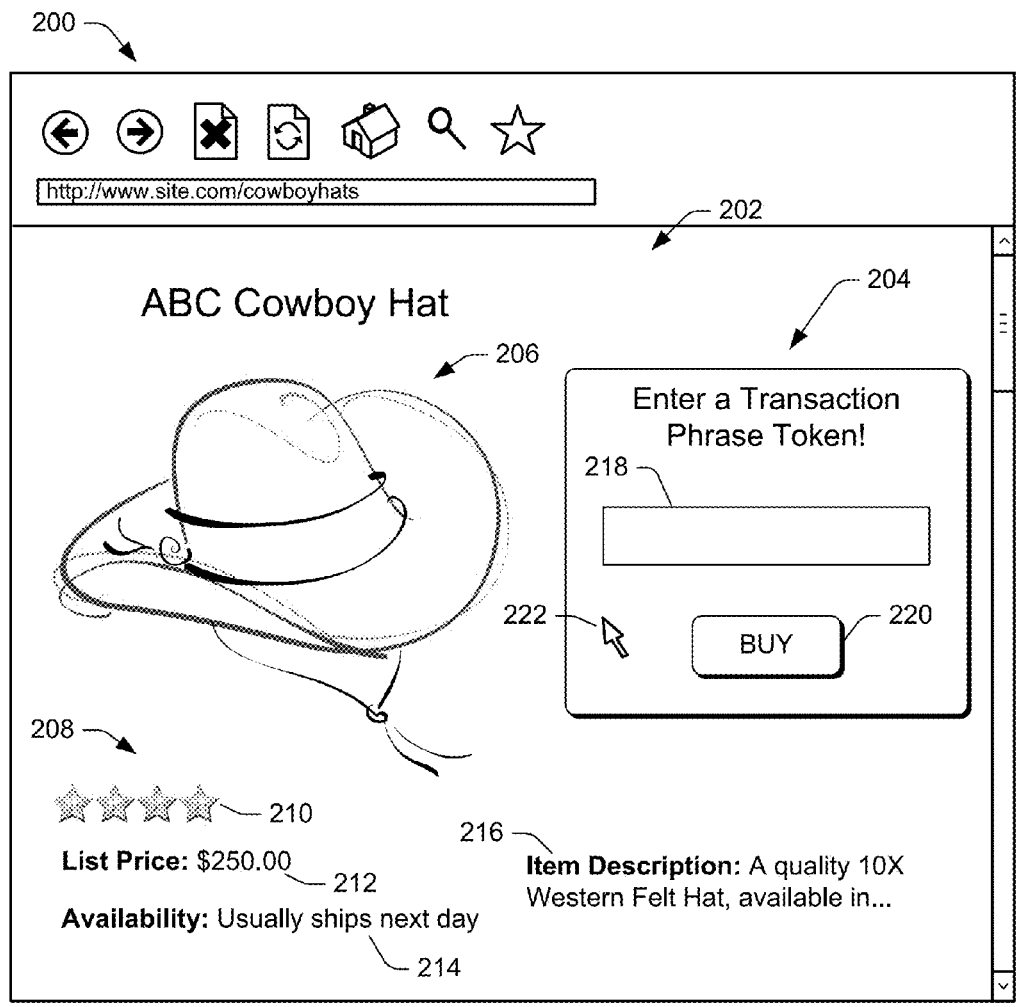
FIG. 2 illustrates an example screen rendering of a page served by the service provider of FIG. 1. Here, the example page includes a widget provided by the transaction processing service of FIG. 1. The widget allows the user to enter a payment identifier for the purpose of requesting to purchase the illustrated item.

Content 124, meanwhile, may comprise content that enables user 102 to enter into a transaction with the service provider hosting site 106. In instances where site 106 comprises an e-commerce site, for example, content 124 may comprise a widget that allows user 102 to enter into a transaction with the service provider to consume or obtain content 122. FIG. 2 illustrates an example of content 122 and 124, and is discussed in detail below.

In addition to storing browser 116, memory 114 stores an identifier 126. In some instances, identifier 126 identifies computing device 104 operated by user 102. Identifier 126 may identify this device in a number of ways. For instance, identifier 126 may be associated with the device itself or with an application or other software stored on or accessible by the device. Here, for instance, identifier 126 may be a cookie associated with browser 116. In some instances, such as the example where identifier 126 is a cookie, user 102 may choose to remove identifier 126 from device 104. In these instances, device 104 may or may not receive another identifier at a later point in time.

In some instances, transaction processing service 110 stores identifier 126 on device 104 for the purpose of enabling user 102 to engage in transactions with service providers, such as the service provider associated with site 106. For instance, envision that user 102 wishes to purchase content 122, which may comprise an item for sale on service provider site 106.

Here, content 124 may comprise a widget that allows user 102 to enter a payment identifier (e.g., a credit card number, bank account number, or other payment information) onto page 120 for the purpose of requesting to purchase the item for sale. When user 102 makes this request, device 104 may send the request along with identifier 126 to transaction processing service 110. In response, service 110 may send additional content to device 104 for rendering on page 120. This additional content may comprise a request that user 102 approve the now-pending transaction. If user 102 were to indeed request to approve the transaction, then device 104 may send this approval request along with identifier 126 back to transaction processing service 110. Service 110 may then compare the received identifiers to determine if the identifiers match. If so, then service 110 may run additional checks before automatically approving the transaction without requiring user 102 to explicitly provide authentication information. For instance, service 110 may not require that user 102 sign into an account with service 110 and/or with the service provider. Instead, the device provides authentication information in the form of the identifier(s). Examples of these additional checks are discussed in detail below.

As illustrated, transaction processing service 110 may be hosted by one or more servers 128(1), (2), . . . (P). Servers 128(1)-(P) store or have access to content 124, as well as a payment identifier database 130. Payment identifier database 130 stores or otherwise has access to information associated with payment identifiers of users that employ transaction processing service 110 for the purpose of engaging in transactions with service providers. These payment identifiers may include, without limitation, credit card numbers, bank account numbers, gift card numbers, lines of credit, and/or any other instrument that may be used to conduct a transaction with a service provider.

Additionally, the stored payment identifiers may or may not identify the payment instrument that is associated with the identifier. For instance, while a payment identifier such as a credit card number may identify the payment instrument (i.e., the credit card), other stored payment identifiers may comprise transaction phrase tokens. Transaction phrase tokens may be free from information identifying the actual payment instrument that is linked with the phrase token.

As described in U.S. Provisional Application No. 60/823, 611, filed on Aug. 25, 2006, and U.S. patent application Ser. No. 11/548,111, filed on Oct. 10, 2006, both entitled UTILIZING PHRASE TOKENS IN TRANSACTIONS and both incorporated herein by reference, a transaction phrase token may comprise a set of characters that has a secondary meaning to user 102 or to a user associated with the transaction phase token. In addition to comprising a phrase (e.g., "Work to Live"), the transaction phrase token may also take the form of a physical card (e.g., similar in size and shape to a credit card). Whatever its form, the transaction phrase token may link to a payment instrument, such as a bank account or a credit card. For example, a transaction phrase token associated with user 102 may link with a payment instrument (e.g., a bank account) of user 102 or some other person or entity. Therefore, user 102 (and potentially one or more other users) may employ this transaction phrase token as a payment method for future purchases.

Furthermore, transaction phrase tokens may be associated with certain rules that dictate when and how a user may employ a transaction phrase token for purchases. Similarly, the user that controls use of the transaction phrase token (e.g., the person associated with the underlying payment instrument) may differ from a user of the token. For instance, a mother may create a token for her daughter ("Sonya") entitled "Sonya's Textbooks". Once the mother creates or approves creation of the token, Sonya may then specify this token as a payment method. By identifying this token as a payment method, the daughter thus identifies the mother (i.e., the person associated with the linked transaction account or payment instrument) as the payer for these purchases.

Similar to the discussion above, this transaction phrase token may be associated with predefined rules. For instance, the mother may create a rule that pre-approves purchases of certain textbooks. The mother may also employ other rules, such as dollar amounts, time limits, and the like. In these instances, when the daughter employs the token as a payment method, the transaction processing service 110 may compare the requested purchase with the rules associated with the token. The service may then complete or cancel the requested purchase according to the token's rules. Conversely or additionally, service 110 may notify the user that controls use of the token (here, the mother) to request that this user approve or deny the requested purchase.

Because transaction phrase tokens merely comprise a string of characters in some instances, such tokens may be more freely shared than when compared with other types of payment identifiers, such as credit card numbers, bank account numbers, and the like. However, due to the lenient nature of transaction phrase tokens, transaction processing service 110 may take special care to ensure that a user that controls use of the token actually wishes to approve a purchase or other transaction. For instance, imagine that user 102 is a user that controls use of a transaction phrase token. When user 102 requests to conduct a transaction, transaction processing service 110 will want to ensure that user 102 is actually the user who approves the request in order to avoid fraudulent purchases made with the user's phrase token.

FIG. 1 further illustrates that payment identifier database 130 stores or has access to a table 132. Table 132 lists one or more payment identifiers associated with one or more users of service 110. While each of the illustrated payment identifiers comprise transaction phrase tokens, it is to be appreciated that table 132 may store multiple other types of payment identifiers (e.g., credit card numbers, bank account numbers, gift card numbers, etc.). It is also to be appreciated that the described and claimed techniques may be equally applicable to each of these other types of payment identifiers.

As illustrated, table 132 includes a column 134 entitled "Payment ID", a column 136 entitled "Associated User", a column 138 entitled "ID", and a column 140 entitled "Auto Approve Enabled?". Column 134 lists names of the payment identifiers stored in database 130. The illustrated payment identifiers, which here comprise transaction phrase tokens, include "Work to Live", "Text Bookworm", and "Liberty Belle". As described above, each of these tokens may map to an underlying transaction account or payment instrument. Column 136, meanwhile, lists corresponding users that control the tokens listed in column 134. The user that controls use of the first listed token, for instance, is named "John Smith". For purposes of the instant example, John Smith (as well as his token "Work to Live") corresponds to user 102.

Next, column 138 lists a corresponding identification of a device and/or application upon which the user interacts with transaction processing service 110. This identification may uniquely identify a device in many ways. For instance, transaction processing service may store a cookie on a browser stored on a user's device. By storing the cookie on a browser, the cookie functionally serves to identify the device upon which the browser is stored. Multiple other types of data may alternatively or additionally be stored on a device and/or application. In each instance, the identifier listed in column 138 functions to associate a device and/or application with a user of a payment identifier.

In the current example, the identifications listed in column 138 comprise a hash of a cookie stored on users' devices. For instance, the first listed identifier ("12345") may comprise a hash of identifier 126 stored on computing device 104 of user 102. As will be appreciated, any number of hash functions may be used, such as MD5, SHA-1 HMAC, and the like. Furthermore, for further security, transaction processing service 110 may employ a secret key when hashing a cookie or other identifier, such as identifier 126.

With use of the identifiers listed in column 138, transaction processing service 110 may compare received identifiers by hashing the received identifiers (with or without the secret key, depending upon the implementation). For instance, if service 110 were to receive identifier 126 from device 104, service 110 could hash identifier 126 to compare the resulting value with the identifier stored in column 138 ("12345"). Here, service 110 would find that such hash values would match, as the first stored value ("12345") was created by running the same hash on identifier 126.

Finally, column 140 lists, for each illustrated payment identifier, whether the settings associated with each respective payment identifier allow for automatic approval of transactions. Automatic approval may allow a user, such as user 102, to automatically approve a requested transaction without asking user 102 to provide authentication information. For instance, user 102 may not need to sign in to his or her account if transaction processing service recognizes the user (or the user's device, browser, or the like). Here, the first illustrated user (John Smith, corresponding to user 102) has chosen (explicitly or implicitly) to enable automatic approval when requesting approval for transactions made with his token entitled "Work to Live". The second illustrated user, meanwhile, has not chosen to enable automatic approval.

With these illustrative details of transaction processing service in mind, envision that user 102 wishes to purchase an item for sale on service provider site 106 with use of the user's transaction phrase token "Work to Live". To do so, user 102 may enter this token into the widget (content 124) rendered on page 120. This request to purchase the item is then sent to transaction processing service 110, along with identifier 126 associated with the browser and/or device that sent the request. In response, service 110 may send additional content for rendering on browser 116. In other implementations, service 110 may alternatively or additionally send an out-of-channel message (e.g., an email message, an instant message, etc.) to user 102.

In the current example, browser 116 renders the additional content sent by service 110. Here, the additional content requests that user 102 approve the requested transaction. If user 102 wishes to approve the transaction, then the request for approval is sent to service 110, along with identifier 126. Service 110 may then determine if the first identifier with the request to purchase the item is the same as the identifier sent along with the request to approve the purchase.

If the identifiers do not match, then service 110 may deduce that the request to purchase the item was sent from a different device than was the request to approve the purchase. In this instance, it is possible that the user of the first device attempted to trick a user of a second device that is associated with the payment identifier to approve the purchase from the second device. However, because the first identifier would not match the identifier from the second device, service 110 may require the user that controls use of the token to provide authentication information (e.g., a password or the like). By doing so, service 110 may restrict a nefarious user's ability to engage in fraudulent transactions with a payment identifier of another user.

If the received identifiers match, transaction processing service 110 may also analyze table 132 to determine whether or not to automatically approve the transaction, or whether to require user 102 to provide authentication information (e.g., sign-in information) to service 110 for purposes of approving the transaction. Instead, device 104 provides authentication information in the form of the received identifier(s).

To make this determination, service 110 may first look to column 134 to find the payment identifier used by user 102 when requesting the transaction. Here, service 110 will determine that the payment identifier used (the transaction phrase token "Work to Live") is associated with John Smith. Service 110 will also determine that John Smith employs a browser corresponding to an identification of "12345". Again, this identification may comprise a hash function applied to a cookie stored on John Smith's computing device 104.

With this information, service 110 may run the same hash function to one or both of the received identifiers. For instance, service 110 may run the hash function against the identifier received in the request to approve the transaction (here, identifier 126). When service 110 does so, service 110 will determine that the received identifier(s) matches the identifier stored in column 138 and associated with John Smith (user 102).

As such, service 110 may safely assume that John Smith (user 102) did indeed himself approve the transaction. Furthermore, because both the identifiers sent with the request to conduct the transaction and the identifier sent with the request to approve the transaction match one another, service 110 may also safely assume that the same user sent both requests. Here, service 110 will likely assume that user 102 sent both requests and, hence, that service 110 may safely allow for automatic approval if the corresponding user so desires.

Finally, transaction processing service 110 analyzes table 132 to determine whether the settings associated with the employed payment identifier ("Work to Live") allows for automatic approval. As column 140 illustrates, the settings associated with this payment identifier do indeed allow for automatic approval. Based in part on this determination and in part on the matching of the identifiers discussed immediately above, service 110 may approve the requested transaction without requiring user 102 (John Smith) to sign in to his account or otherwise provide authentication information. If, however, the settings associated with the employed payment identifier do not allow for automatic approval, or if the received identifier(s) does not match the identifier stored in column 138 for the corresponding token, then service 110 may require user 102 to provide authentication information (e.g., by signing in to his account with service 110) for purposes of approving the transaction. In either instance, once service 110 approves the transaction, the service provider may send or provide any purchased goods and/or services to user 102.

Illustrative User Interfaces

FIG. 2 illustrates an example screen rendering of a page 200 served by service provider site 106 as well as transaction processing service 110 of FIG. 1. Here, page 200 includes content 202 served by the service provider as well as a widget 204 whose content is served by transaction processing service 110. Here, widget 204 allows the user to enter a payment identifier for the purpose of engaging in a transaction with service provider site 106. For instance, widget 204 may allow the user to request to purchase the illustrated item from the service provider.

Content 202 includes an illustration of an "ABC Cowboy Hat" 206 for sale by the service provider. While content 202 illustrates a hat, content 202 could similarly illustrate one or more alternative or additional items for sale or consumption. Content 202 further includes details 208 about hat 206. Details 208 include a rating 210 of the hat, a price 212 of the hat, availability 214 of the hat, and a description 216 of the hat. Of course, it is to be appreciated that details 208 are included for context only and that other implementations may employ more or less information than the illustrated implementation.

Widget 204, meanwhile, includes a text box 218 and an icon 220 entitled "Buy". Text box allows a user, such as user 102, to enter a payment identifier into text box 218. Once a payment identifier is entered, user 102 may then select icon 220 (e.g., with a cursor 222) to request to purchase hat 206 from the service provider. In the illustrated example, this request and corresponding payment identifier is submitted to transaction processing service 110.

Figure 3:
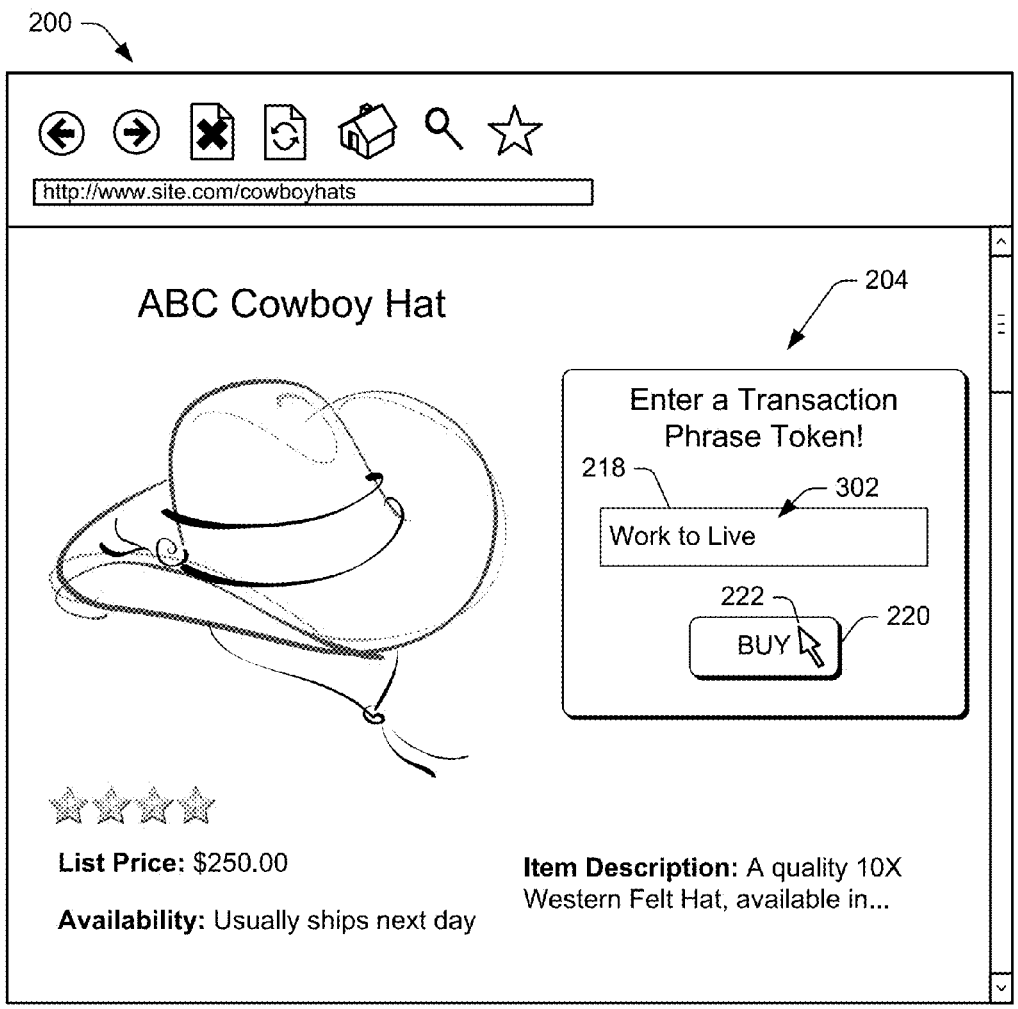
FIG. 3 illustrates the example screen rendering of the page from FIG. 2 after the user has entered a payment identifier into a text box of the widget.

FIG. 3 illustrates page 200 after user 102 has entered a payment identifier comprising a transaction phrase token 302 ("Work to Live") into text box 218. FIG. 3 also illustrates that user 102 then selects icon 220 to request to purchase the illustrated hat. At this point, the request to purchase the hat is sent to service 110, potentially along with the entered transaction phrase token, details about the requested purchase, and an identifier of a device from which the request was sent. For instance, identifier 126 stored on browser 116 may be sent along with the request. Upon receipt of the request, transaction processing service 110 may determine whether rules associated with the entered payment identifier allow the requested transaction. If so, then service 110 may send a request to approve the transaction to the device that sent the request to conduct the transaction. In other implementations discussed below, however, the service may send this request for approval to an email account or the like of the user associated with the payment identifier.

Figure 4:
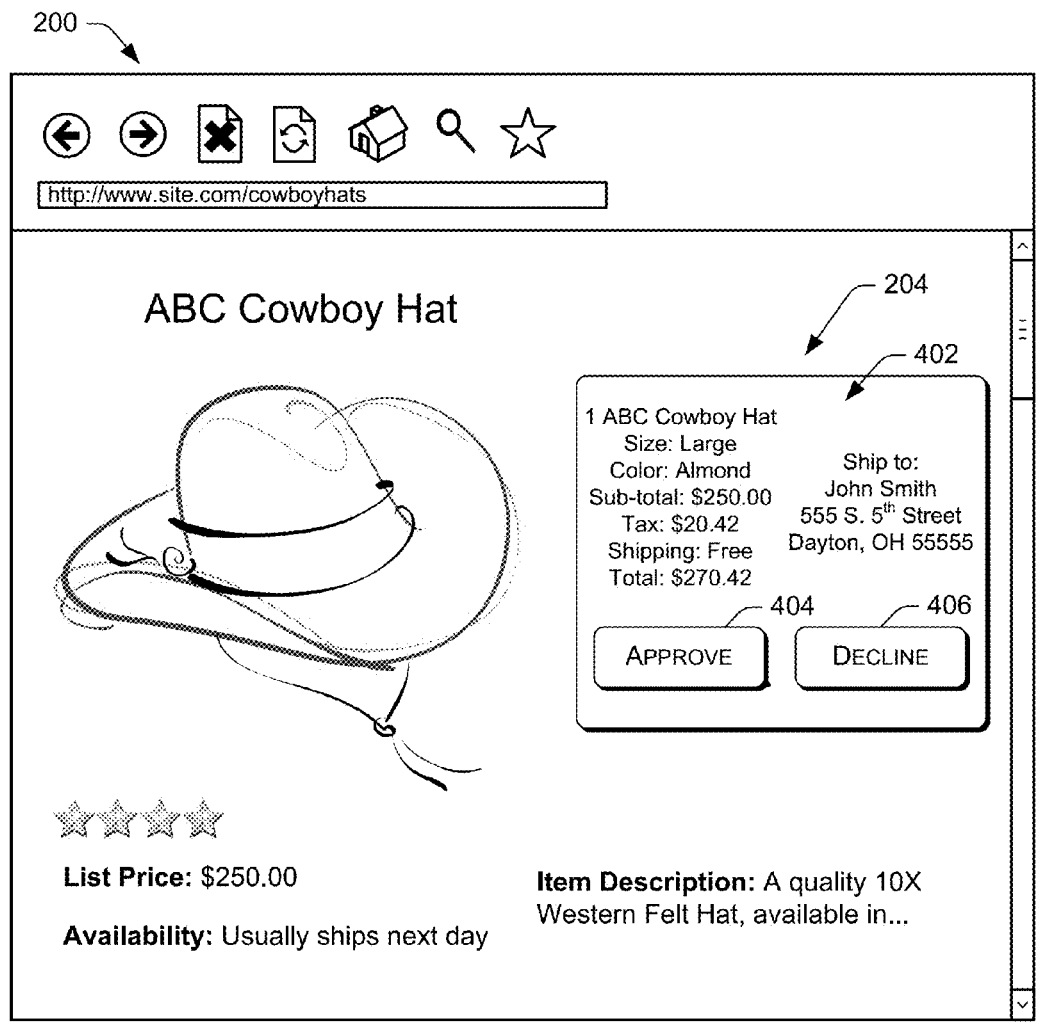
FIG. 4 illustrates the example screen rendering of the page from FIGS. 2 and 3 after the user has selected the "buy" icon from the widget of FIGS. 2 and 3. Here, the widget allows the user to request to approve or decline the transaction.

Next, FIG. 4 illustrates page 200 after the request to purchase the hat has been sent to transaction processing service 110 and after service 110 has elected to request approval for the transaction. For instance, service 110 may have analyzed rules associated with the token entitled "Work to Live" and may have determined that the requested purchase is allowable under the rules associated with the token.

Here, page 200 includes details 402 about the requested transaction, as well as icons 404 and 406. When selected, icon 406 (entitled "Decline") causes browser 116 to send a request to service 110 decline the transaction. When icon 404 (entitled "Approve") is selected, however, then browser 116 operating on device 104 sends a request to approve the transaction to service 110. In addition, device 104 may send details about the requested purchase and an identifier of a device from which the request was sent. For instance, identifier 126 stored on browser 116 may be sent along with the request. If transaction processing service 110 approves the transaction, as discussed in detail below with regards to FIGS. 7-9, then service 110 may send confirmation details as illustrated in and described with reference to FIG. 5.

Figure 5:
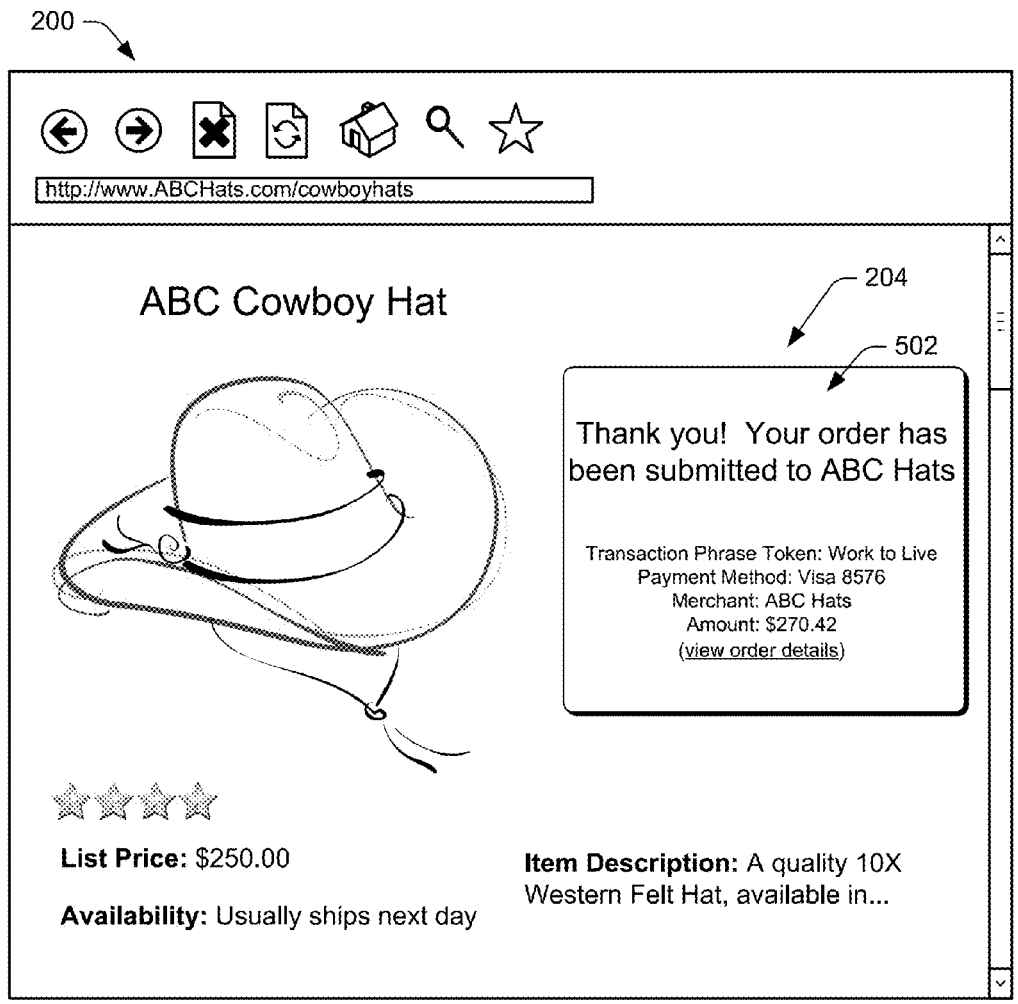
FIG. 5 illustrates one example screen rendering of the page from FIGS. 2-4 after the user has selected the "approve" icon from FIG. 4. Here, the transaction processing service of FIG. 1 has approved the transaction without asking the user to provide authentication by, for example, signing into an account.

FIG. 5 illustrates page 200 after the user 102 has selected icon 404 and after service 110 has approved the transaction without asking user 102 to provide authentication information. Here, widget 204 includes confirmation details 502. Confirmation details 502 may includes the payment identifier used for the transaction (here, the transaction phrase token), the underlying transaction account or payment instrument, the name of the service provider (e.g., merchant), the amount of the transaction, and/or additional details. Furthermore, widget 204 may include a link that, when selected, causes browser 116 to render a page having even more order details associated with the executed transaction. Finally, once service 110 has approved the transaction, the service provider associated with site 106 may then send hat 206 to user 102.

Figure 6:
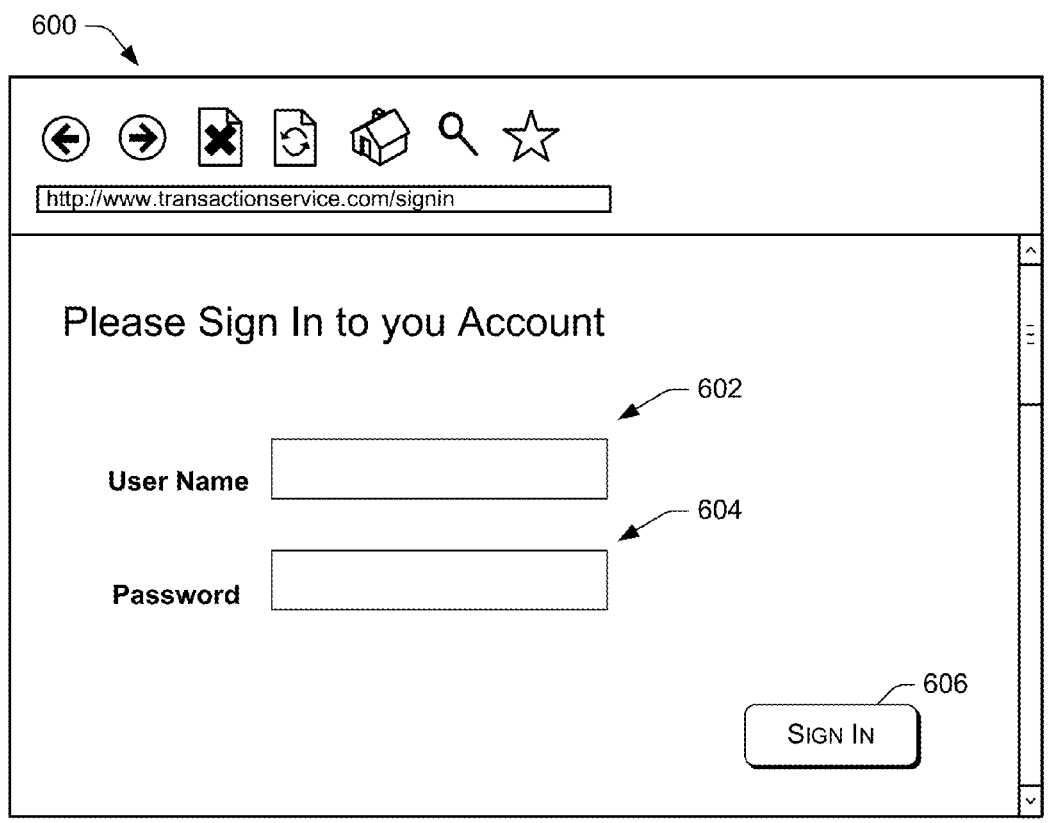
FIG. 6 illustrates another example screen rendering served by the transaction processing service after the user has selected the "approve" icon from FIG. 4. Here, the transaction processing service requires the user to sign into an account of the user before the processing service will approve the transaction.

FIG. 6, meanwhile, illustrates a sign-on page 600 that service 110 may serve and browser 116 may render if service 110 does not automatically approve the transaction after user 102 selects icon 404 from FIG. 4. This may occur, for instance, if the identifier sent along with the request to approve the transaction does not match the identifier stored in table 132 of database 130. This may alternatively occur if the settings associated with the employed payment identifier do not allow for automatic approval.

In these instances, service 110 may serve sign-on page 600, which includes a user name field 602 as well as a password field 604. Page 600 further includes an icon 606 (entitled "Sign In") that, when selected, causes user 102 to sign in to transaction processing service 110. Upon a successful sign on, service 110 may then automatically approve the pending transaction or may render a page that allows user to select whether or not to approve the transaction (as well as potentially any other pending transactions). While FIG. 6 illustrates sign-on page 600, service 110 may ask user 102 for other types of authentication and/or identification information.

Illustrative Flow Diagrams

Figure 7:
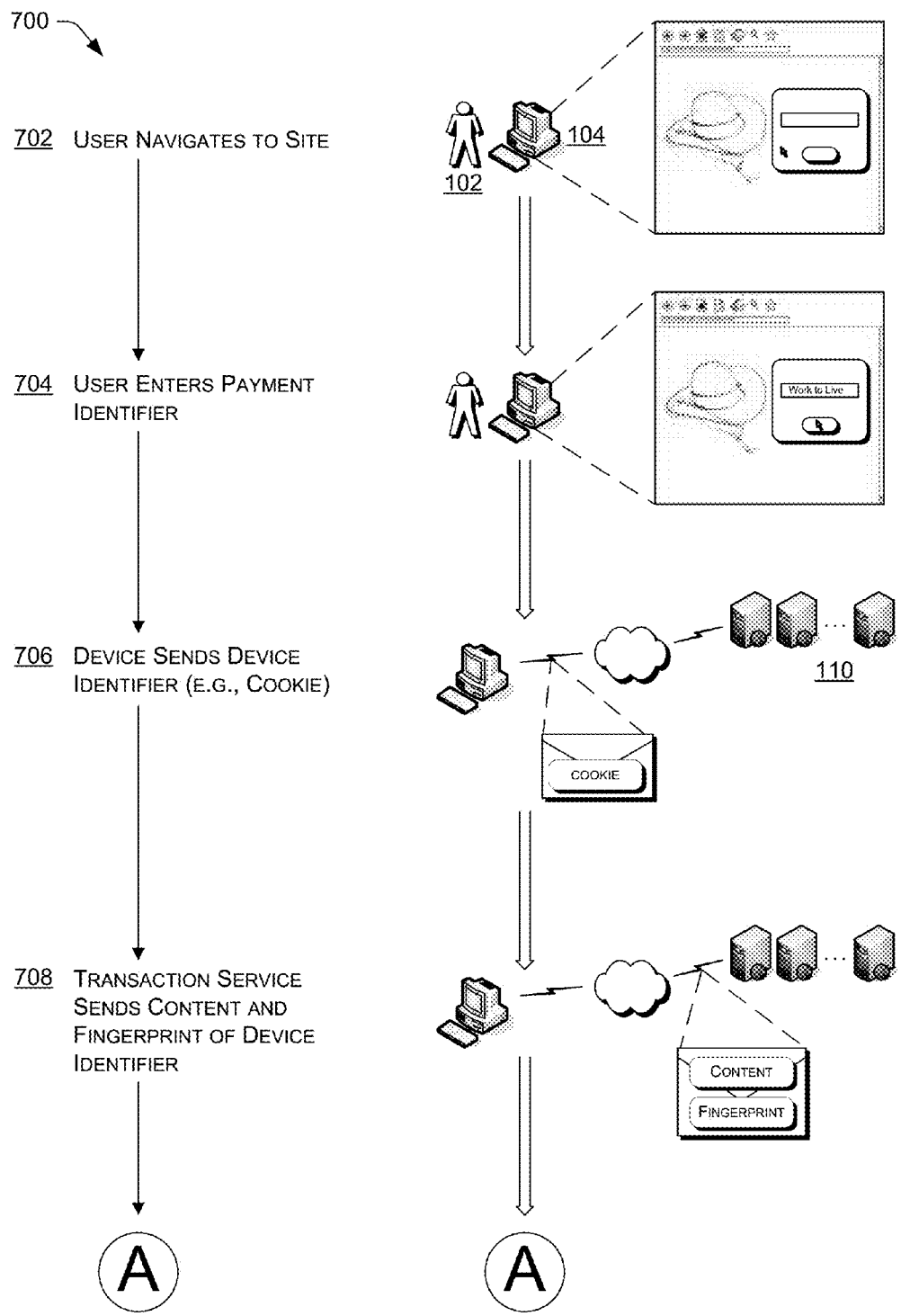
FIGS. 7-10 illustrate an example process that includes the user navigating to a site of a service provider, requesting a transaction with the service provider, and requesting to approve the transaction.
Figure 8:
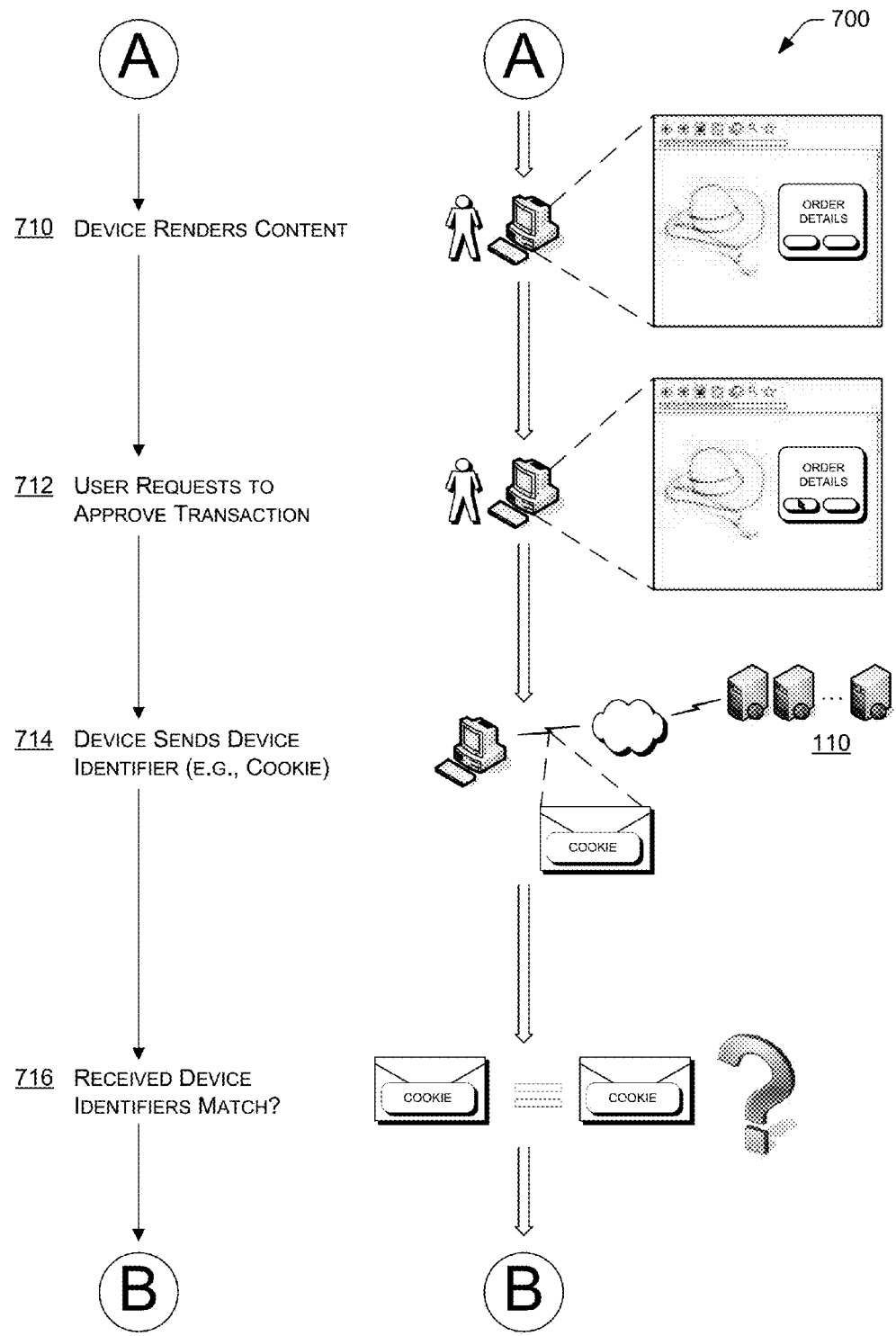
Figure 9:
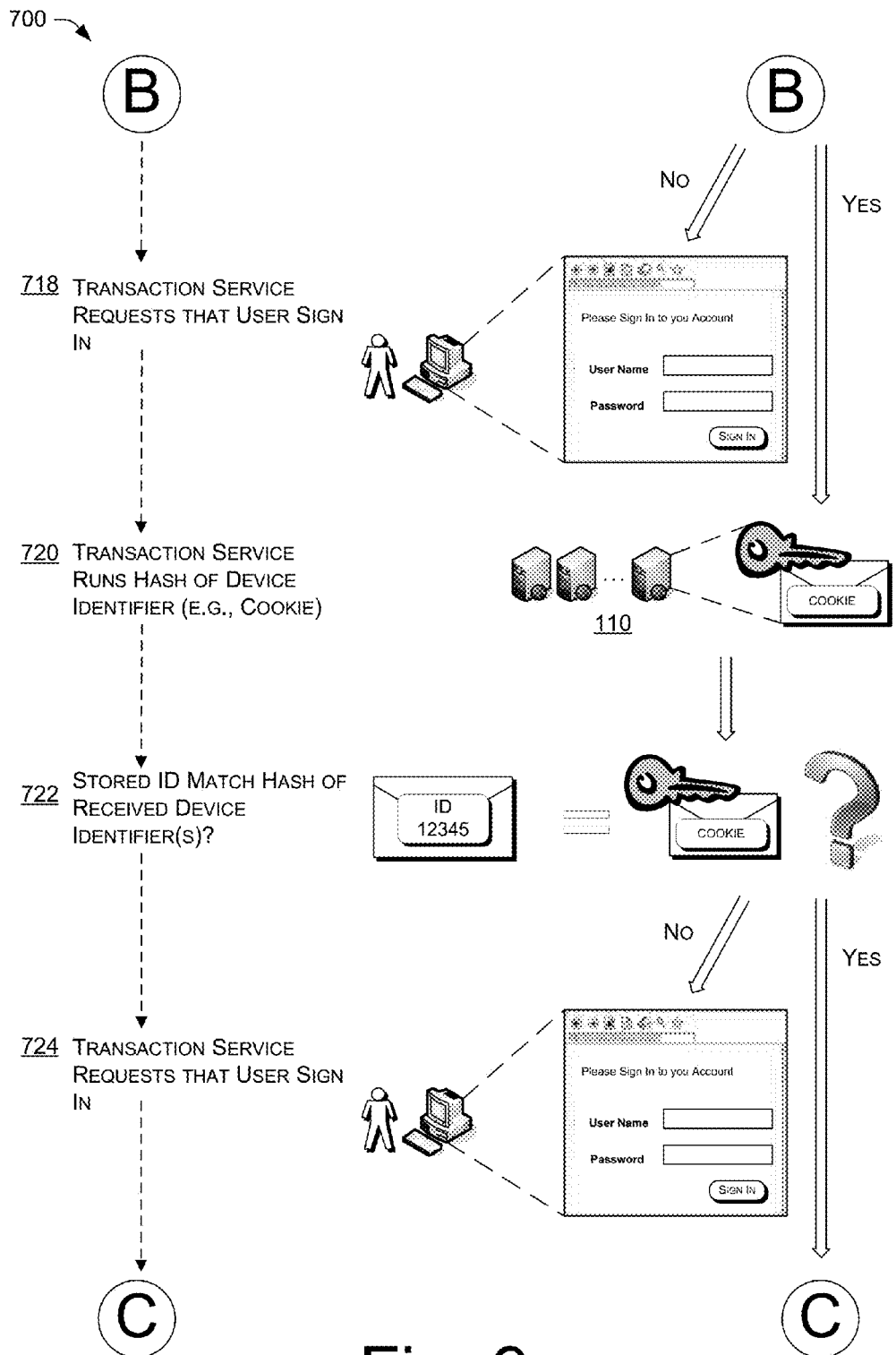

FIGS. 7-9 illustrate an example process 700 for employing the techniques described above with reference to architecture 100. Process 700 includes operation 702, which represents user 102 operating computing device 104 to navigate to service provider site 106. While FIG. 7 illustrates the described techniques in the context of client-server navigation, it is again noted that the described techniques may be equally applicable in other contexts.

Next, operation 704 represents user 102 entering a payment identifier (e.g., "Work to Live") into a widget or other tool provided by transaction processing service 110 for the purpose of requesting to conduct a transaction with a service provider. Continuing the example from above, user 102 here requests to purchase the illustrated hat. At operation 706, user 102 elects to request to conduct the transaction, at which point device 104 (and/or an application stored thereon, such as browser 116) sends identifier 126 to service 110. As discussed above, identifier 126 uniquely identifies device 104 and/or an application stored thereon, such as browser 116. Here, device 104 sends a cookie that is stored on browser 116 to service 110. In some instances, service 110 previously stored an identification of this cookie for the purpose of identifying future communications with device 104 and/or browser 116.

Upon receiving the request and the cookie, transaction processing service 110 sends additional content as well as a fingerprint of the cookie back to device 104 at operation 708. FIG. 8 continues the illustration of process 700, and includes operation 710. Here, device 104 renders the additional content provided by service 110. In some instances, the additional content comprises details 402 about the requested transaction, as well as icons 404 and 406 illustrated in FIG. 4. As discussed above with regards to FIG. 4, these icons may allow user 102 to either choose to approve the transaction or decline the transaction.

In some instances, the approve icon 404 may be associated with a target link that includes the fingerprint of the cookie sent by service 110. As such, if and when user 102 selects the approve icon, the device may again send an identifier. If the sent identifier does not match the identifier originally sent with the request to conduct the transaction at operation 706, then service 110 may ask user 102 to provide authentication information (e.g., may ask user 102 to sign into his account in order to approve the transaction). Such an approach may be warranted to avoid potentially fraudulent approvals, since the device (and/or browser) that sent the request to conduct the transaction does not match the device (and/or browser) that sent the request to approve the transaction. Of course, in other instances, service 110 may not necessarily require that user 102 sign in or otherwise provide authentication information.

Operation 712 represents user 102 requesting to approve the pending transaction (e.g., by selecting approve icon 404 from FIG. 4). As discussed immediately above, device 104 sends an identifier (such as the illustrated cookie) to transaction processing service 110 at operation 714. At operation 716, service 110 may compare the two received device identifiers (e.g., the two received cookies) to determine whether these identifiers match. If not, then service 110 may ask that user 102 sign in to his account or otherwise provide authentication information. Of course, in other instances service 110 may choose only to compare the cookie sent with the approval request to the identifier stored in table 132 when determining whether or not to ask user 102 to provide authentication information.

FIG. 9 continues the illustration of process 700 and begins with operation 718. Here, transaction service 110 asks user 102 to sign in or otherwise provide authentication information if the received device identifiers do not match. In the current example, however, process 700 proceeds to operation 720, as both received cookies were from device 104 and from browser 116 and, hence, both identifiers match one another.

Operation 720 represents that, in the illustrated example, transaction processing service 110 runs a hash of the received cookie (or cookies). At operation 722, service 110 compares the hash of the received cookie(s) with the identifier associated with the payment identifier stored by service 110. As discussed above with regards to FIG. 1, service 110 may store hash values of cookies stored on users' browsers (and, hence, stored on corresponding devices). If the hash of the received cookie(s) does not match the identifier stored in column 138 of table 132, then at operation 724 service 110 may ask that user 102 sign in to his account or otherwise provide authentication information for the purpose approving the transaction.

Figure 10:
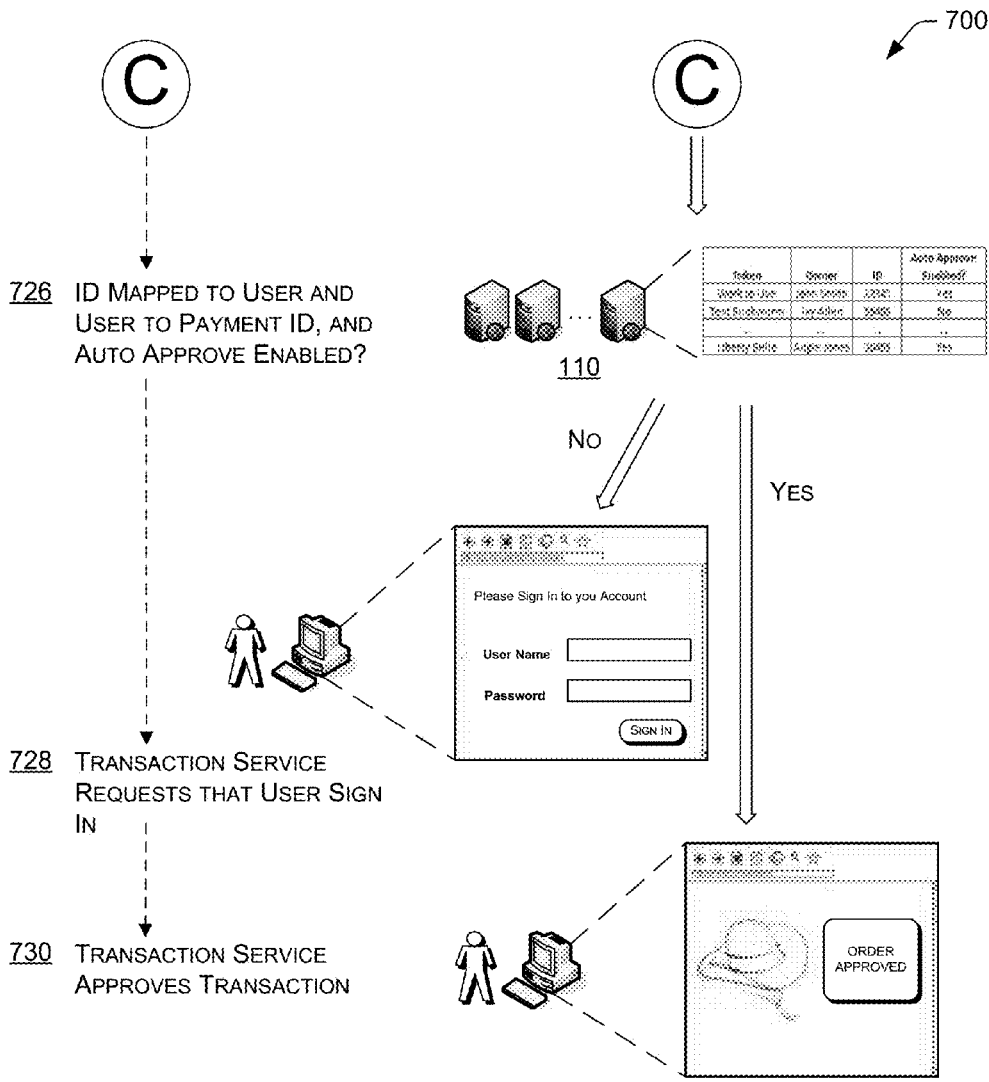

If, however, the hash of the received cookie(s) matches the stored identifier, then process 700 may continue to operation 726 on FIG. 10. Here, transaction processing service 110 may map the received cookie(s) and the received payment identifier to user 102. First, service 110 may determine if the stored identifier and the received payment identifier actually map to user 102, who is associated with the stored identifier "12345". If so, then service 110 determines whether the settings associated with the payment identifier allow for automatic approval of transactions. For instance, user 102 may have previously elected to allow or not allow automatic approval.

If service 110 determines that the stored identifier does not map to the user or if the settings associated with the token do not allow for automatic approval, then service 110 asks user 102 to, for instance, sign in at operation 728. If, however, each of the analyses checks out at operation 722, then service 110 automatically approves the transaction at operation 730. At this point, the underlying transaction account or payment instrument associated with the payment identifier may be charged. Furthermore, the purchased goods or services, such as the hat, may be sent or otherwise provided to user 102.

Figure 11:
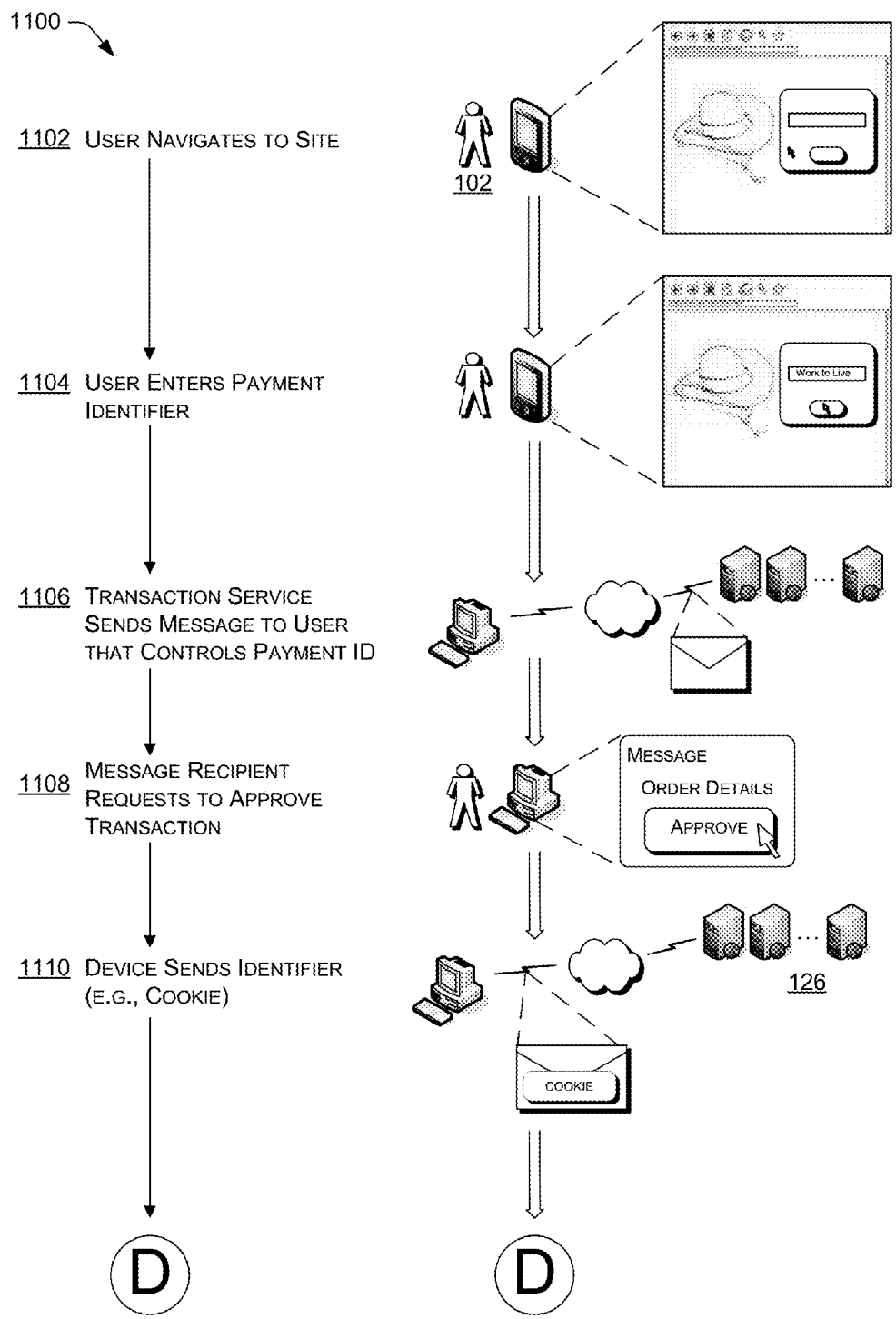
FIGS. 11-12 illustrate an example process that includes the user navigating to a site of a service provider and requesting a transaction with the service provider by entering a payment identifier. Later, a transaction processing service sends a message to a user associated with the payment identifier requesting approval of the transaction.
Figure 12:
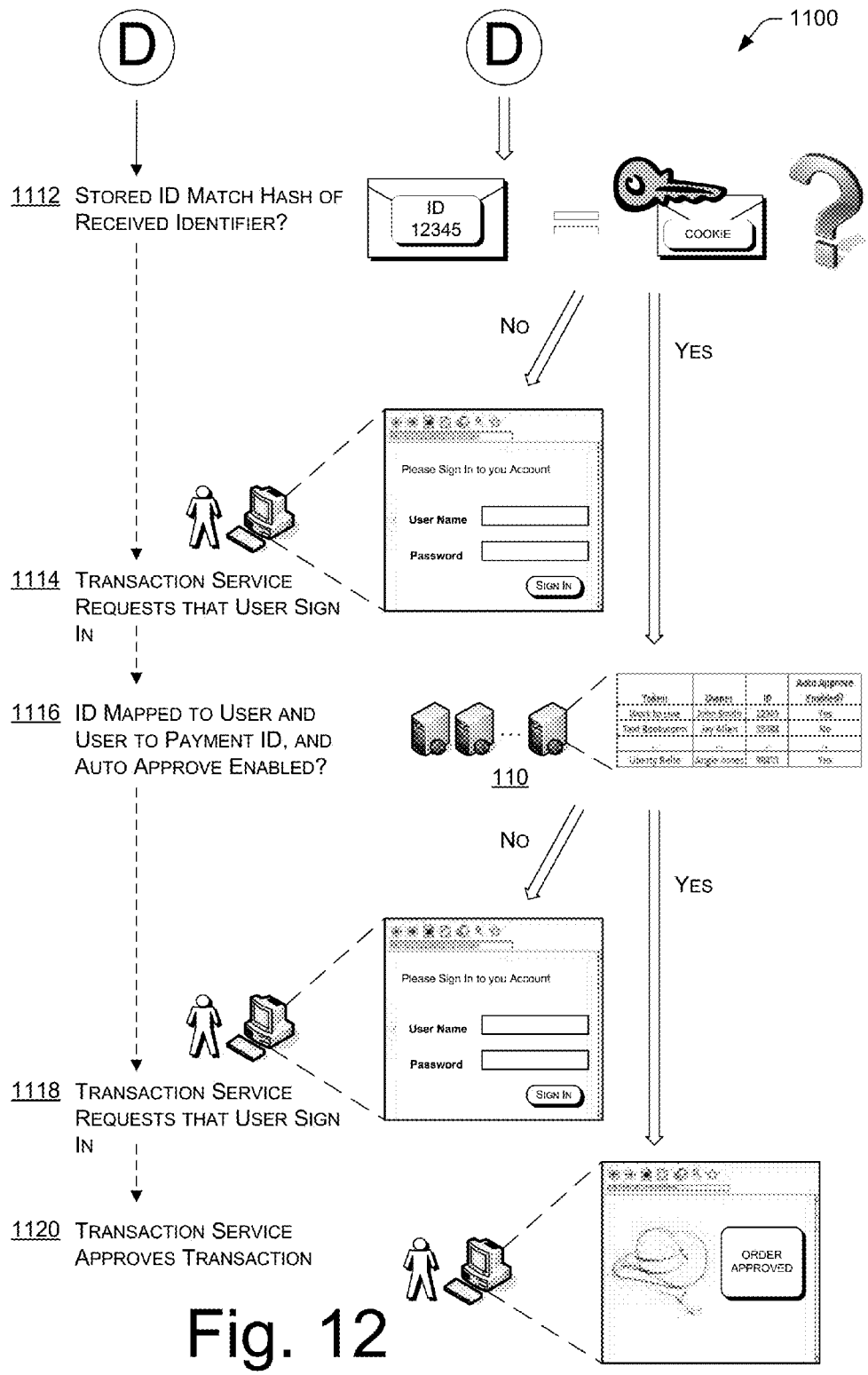

FIGS. 11-12 illustrate another example process 1100 for employing the techniques described above with reference to architecture 100. Process 1100 includes operation 1102, which represents user 102 operating computing device 104 to navigate to service provider site 106. While FIG. 11 illustrates the described techniques in the context of client-server navigation, it is again noted that the described techniques may be equally applicable in other contexts.

Similar to operation 704 of process 700, operation 1104 represents user 102 entering a payment identifier (e.g., a credit card number, transaction phrase token, etc.) into a widget for the purpose of requesting to purchase a hat for sale by a service provider. Next, operation 1106 represents that transaction processing service 110 sends a message to a user associated with the entered payment identifier. That is, service 110 may analyze table 132 to determine a user that controls use of a payment identifier entered by user 102. Service 110 may then send a request to approve the transaction to the user associated with the token (e.g., the user that controls the payment identifier and/or the underlying payment instrument). In some instances, this message is via a channel other than the widget upon which user 102 entered the token. Hence, this message may be sent to a device that is different from the device initially employed by the user to request the transaction. For instance, service 110 may send an email message, a short messaging service (SMS) text message, or any other type of message to user 102.

Similar to icon 404 of FIG. 4, this received message may include an icon or link entitled "Approve" that, when selected, sends a request to approve the transaction to transaction processing service 110. In some instances, the link or a target link associated with the icon is a unique and signed uniform resource locator (URL). Therefore, when the user associated with the payment identifier (here, user 102) opens up the message and selects the approve icon, the request that is sent back to service 110 includes the signature. As such, service 110 is able to verify that service 110 did indeed create the selected link associated with the approve icon and that the link is indeed valid.

Operation 1108 represents user 102 selecting the approve icon within the received message. In addition to sending the details of the selected link to service 110, device 104 sends identifier 126 (e.g., a cookie) to service 110 at operation 1110.

FIG. 12 continues the illustration of process 1100. At operation 1112, service 110 hashes the received cookie and compares this hash value with the identifier associated with the payment identifier and stored by service 110. If the hash of the received cookie does not match the identifier stored in column 138 of table 132, then at operation 1114 service 110 may ask that user 102 sign in to his account or otherwise provide authentication information for the purpose approving the transaction.

If, however, the hash of the received cookie matches the stored identifier, then process 1100 may continue to operation 1116. Here, transaction processing service 110 may map the received cookie and the received payment identifier to user 102. First, service 110 may determine if the stored identifier and the received payment identifier actually map to user 102, who is associated with the stored identifier "12345". If so, then service 110 determines whether the settings associated with the payment identifier allow for automatic approval of transactions. For instance, user 102 may have previously elected to allow or not allow automatic approval.

If service 110 determines that the stored identifier does not map to the user or if the settings associated with the payment identifier do not allow for automatic approval, then service 110 asks user 102 to provide authentication information at operation 1118. If, however, each of the analyses checks out at operation 1016, then service 110 automatically approves the transaction at operation 1120. At this point, the underlying transaction account or payment instrument associated with the payment identifier may be charged. Furthermore, the purchased goods or services, such as the hat, may be sent or otherwise provided to user 102.

Illustrative Processes

FIGS. 13-17 illustrate example processes 1300-1700 that may be implemented by the architecture of FIG. 1 and/or by other architectures. These processes are each illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

For discussion purposes, the processes are described with reference to the architecture 100 of FIG. 1. In particular, many acts described below may be implemented and performed by transaction processing service 110.

Figure 13:
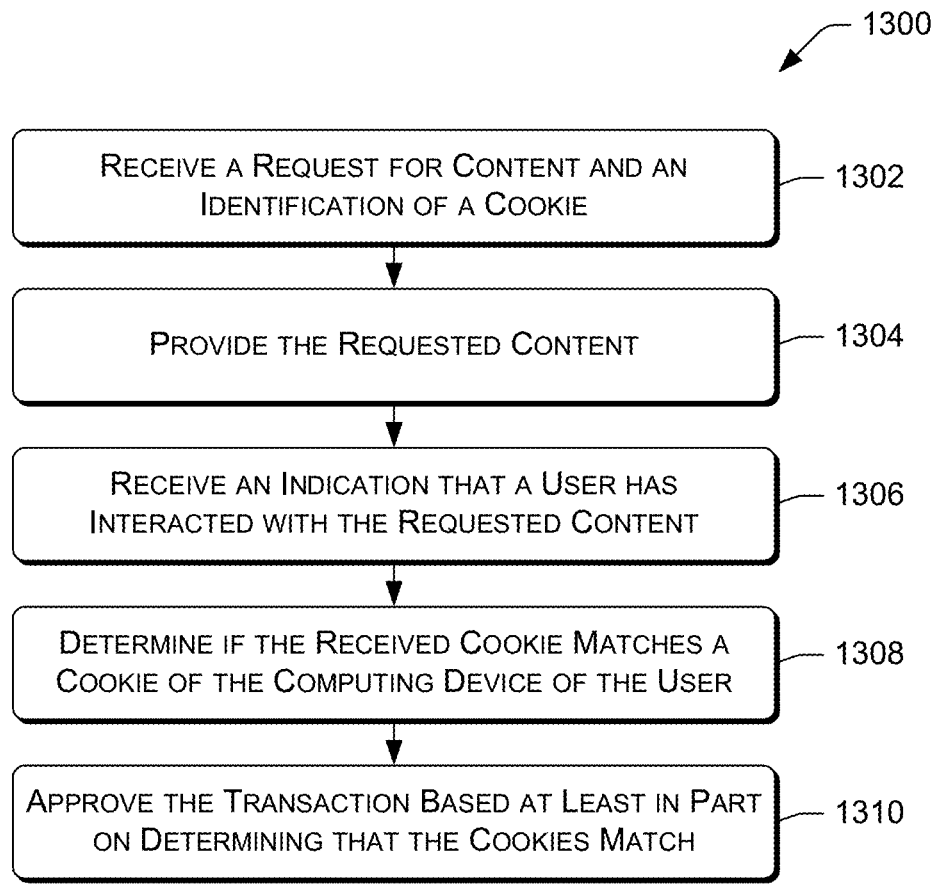
FIGS. 13-17 are flow diagrams of example processes that may be implemented by the architecture of FIG. 1 and/or by other architectures.

FIG. 13 illustrates process 1300, which includes receiving, at operation 1302, a request for content and an identification of a cookie stored on the device that sent the request. The request for content may occur, for instance, in response to user 102 selecting buy icon 220 from FIGS. 2-3. Here, the requested content comprises an opportunity to approve the requested transaction. Furthermore, device 104 may send identifier 126 (here, a cookie) to transaction processing service 110 along with the request for content.

Next, operation 1304 represents providing the requested content to the requesting device. For instance, service 110 may provide (and browser 116 may render) details 402 about the requested transaction, as well as icons 404 and 406 ("Approve" and "Decline"). Next, operation 1306 receives an indication that a user has interacted with the requested content. For instance, service 110 may receive an indication that user 102 has selected approve icon 404. At this point, device 104 may also again send identifier 126 to service 110. Service 110 may then determine if the first received cookie matches the second received cookie. By comparing these cookies, service 110 is able to determine if the device on which the user interacted with the content is the same as the device to which service 110 originally served the content to.

Also in response to receiving the indication of the user interaction, service 110 may determine, at operation 1308, if the received cookie(s) matches a cookie of a computing device (or a browser stored on the device) associated with the user. For instance, service 110 may map the employed payment identifier to a corresponding user, and may map the corresponding user to an identification of a browser and/or device. As discussed above, service 110 may then run a hash (with or without a secret key) of the first and/or second received cookies for comparison to the stored identification (e.g., resident in column 138 of table 132).

Finally, operation 1310 represents approving the transaction if the cookies match one another and potentially if one or more other criteria are met. Again, this comparison may be made by comparing a stored hash value with a hash of a received cookie. In some implementations, service 110 approves the transaction if the cookies match and if settings associated with the employed payment identifier allow for automatic approval of transactions. If, however, the settings do not allow for automatic approval or if the cookies do not match one another, then service 110 may ask that the approving user provide authentication information by, for example, signing in to an account of the user.

Figure 14:
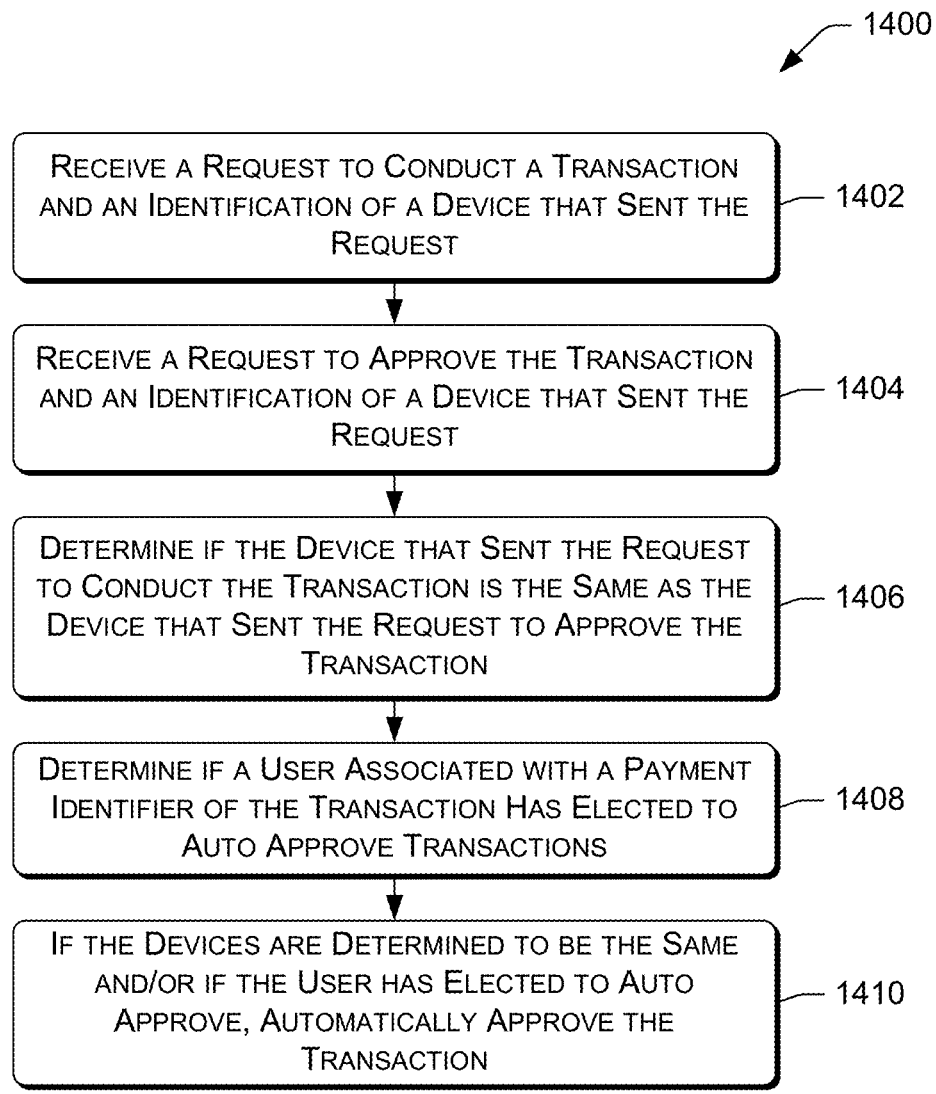

FIG. 14 illustrates a process 1400, which includes receiving a request to conduct a transaction and an identification of a device that sent the request at operation 1402. Next, operation 1404 receives a request to approve the transaction, as well as an identifier of a device that sent the approval request. Operation 1406 then determines if the device that sent the request to conduct the transaction is the same as the device that sent the request to approve the transaction. In some instances, service 110 may make this determination by comparing the two received identifiers to one another.

Operation 1408, meanwhile, represents determining if a user associated with the payment identifier employed for the subject transaction has elected to automatically approve transactions. If so, and if the device that sent the request to conduct the transaction is the same as the device that sent the approval request, then the transaction may be automatically approved at operation 1410. However, if the devices are not determined to be the same or if the settings associated with the payment identifier do not allow for automatic approval, then automatic approval may be denied.

Figure 15:
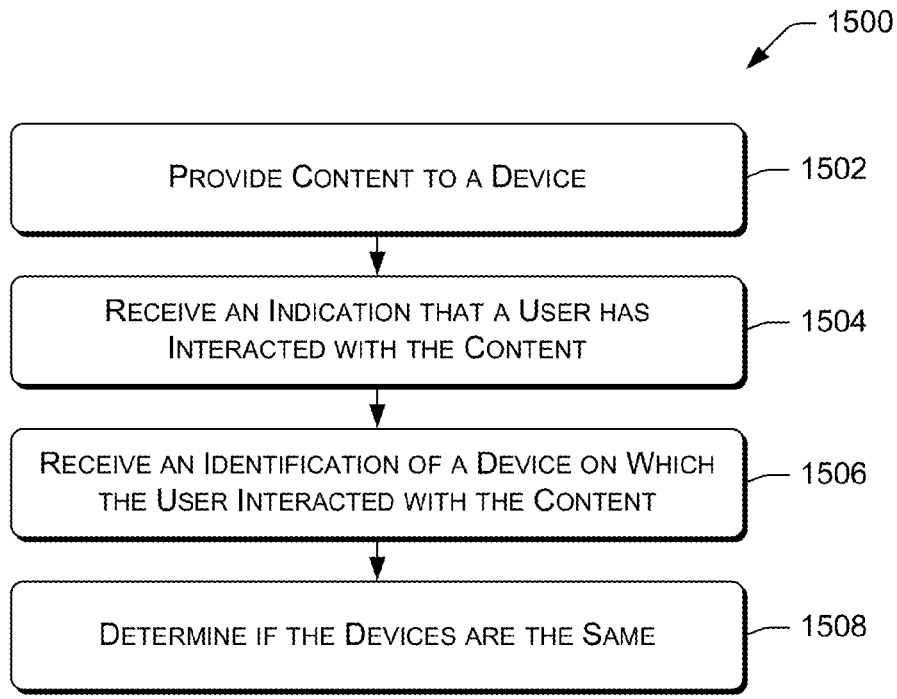

FIG. 15 illustrates process 1500, which again includes providing content to a device at operation 1502. Next, operation 1504 receives an indication that a user has interacted with the provided content. Operation 1506, meanwhile, receives an identification of the device on which the user interacted with the content. Finally, operation 1508 determines if this device is the same as the device to which the content was provided.

Figure 16:
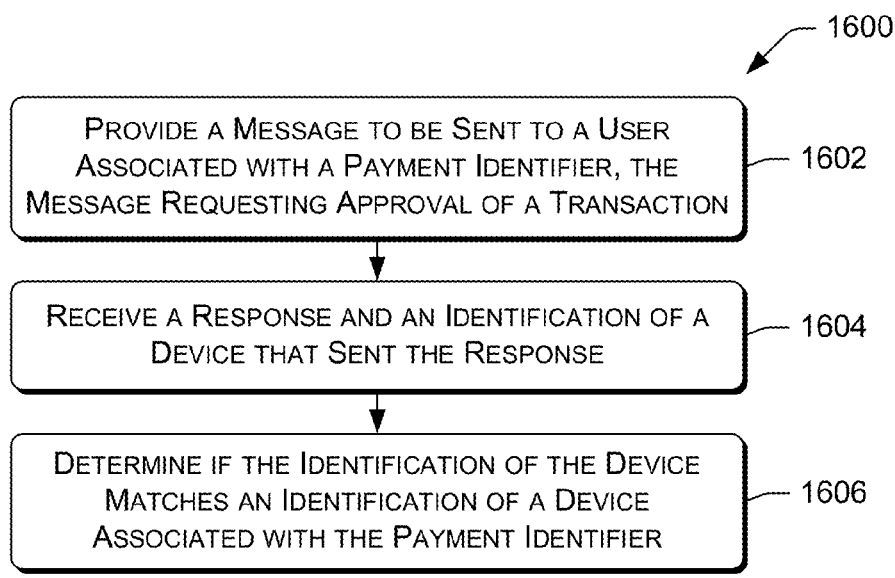

FIG. 16 illustrates process 1600. At operation 1602, this process provides a message to be sent to a user associated with a payment identifier that has been used to request a transaction. For instance, the message may be intended for a user that is associated with the payment identifier (e.g., someone who is associated with an underlying transaction account or payment instrument of the payment identifier). Furthermore, this message may request approval of the requested transaction. The message may comprise an email, instant message, short message service (SMS) message, or the like, and may include an "approve" icon or link as discussed above with reference to FIG. 11.

Operation 1604, meanwhile, receives a response to the message along with an identification of the device that sent the response. As discussed in detail above, this identification may comprise a cookie or any other type of identifier that identifies a device and/or an application stored thereon. If the response includes a request to approve the transaction, then operation 1606 determines if the identification of the device matches an identification of a device associated with the payment identifier employed in the transaction. For instance, transaction processing service 110 may compare a hash of a received cookie against an identifier stored in column 138 of table 132.

Figure 17:
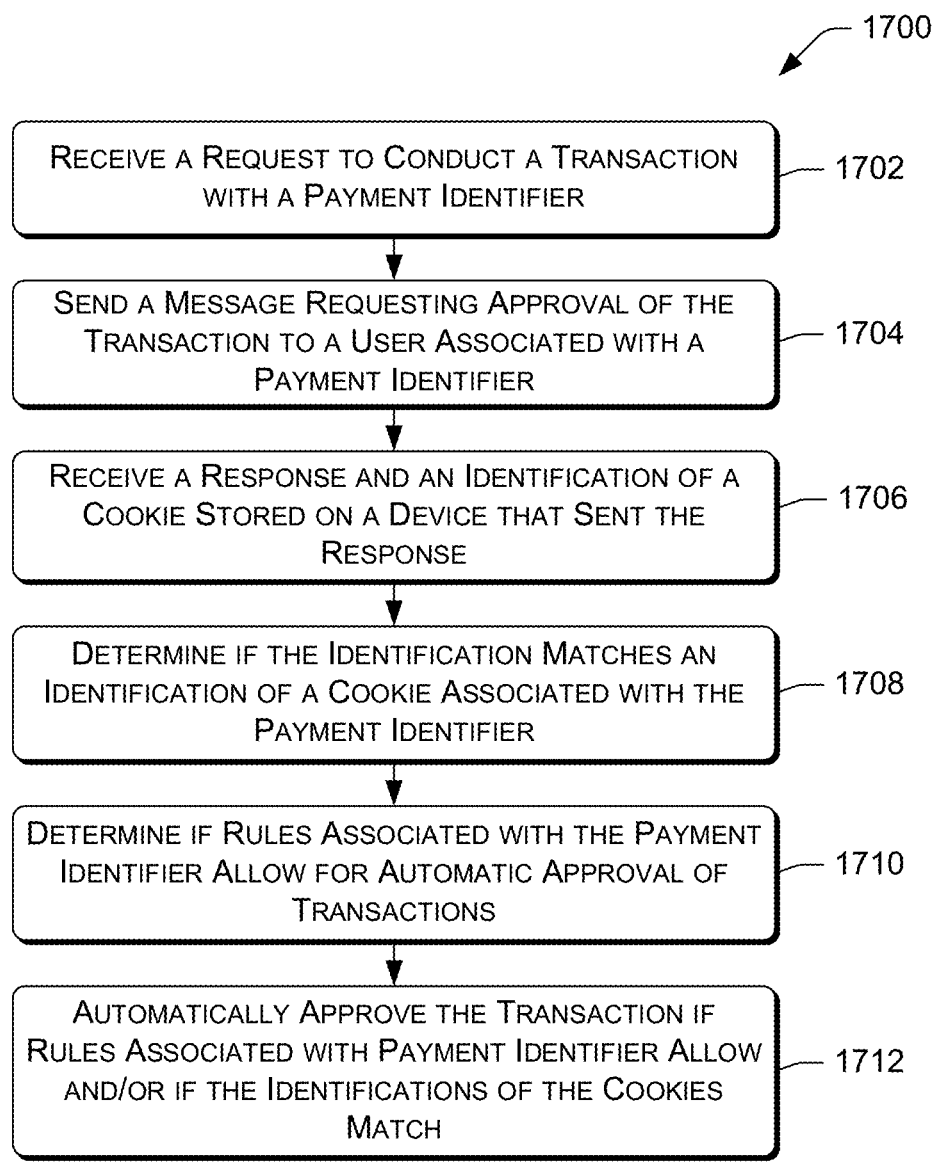

Finally, FIG. 17 illustrates a process 1700, which includes receiving a request to conduct a transaction with a payment identifier at operation 1702. In response, operation 1704 sends a message requesting approval of the transaction to a user that controls use of the payment identifier. The process then receives a response and an identification of a cookie stored on a device that sent the response at operation 1706.

Next, operation 1708 determines if the received identification matches an identification of a cookie associated with the employed payment identifier. Operation 1710, meanwhile, determines if rules associated with the payment identifier allow for automatic approval of transactions. If the rules do not so allow, or if the identifications do not match, then the user that is associated with and/or controls the payment identifier may be asked to provided authentication information for the purpose of approving the transaction. If, however, the rules do allow for automatic approval and if the identifications match, then operation 1712 automatically approves the transaction without requiring the user to provide this information by, for example, sign in to the user's account.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
receiving a first request to conduct a transaction initiated by a user, the first request including a payment identifier;
transmitting a message to a computing device associated with a controlling user associated with the payment identifier, the message including a second request for approval of the transaction;
receiving a response to the message approving the transaction responded to by the controlling user using the computing device and a cookie from the computing device;
performing a hash of the cookie;
determining a hash value of the cookie matches a stored hash value of a previous cookie that was received from the computing device;
mapping the hash value of the cookie and the payment identifier to the controlling user associated with the payment identifier based at least in part on determining that the hash value of the cookie matches the stored hash value of the previous cookie;
determining a setting is elected to automatically approve the transaction without requesting authentication information from the controlling user; and
automatically approving the transaction and refraining from sending, to the computing device, a third request to get the authentication information from the controlling user.

2. A method as recited in claim 1, wherein the payment identifier comprises a transaction phrase token entered into a text box as a payment instrument to conduct the transaction.

3. A method as recited in claim 1, wherein the cookie is associated with a browser stored on the computing device.

4. A method as recited in claim 1, wherein the previous cookie is associated with a browser stored on the computing device.

5. An apparatus comprising:
a memory comprising instructions for executing by one or more processors;
the one or more processors coupled to the memory, and the one or more processors being operable when executing the instructions to:
receive a first request to conduct a transaction initiated by a user using a payment identifier;
responsive to the receiving of the first request, transmit a message to a computing device associated with a controlling user associated with the payment identifier, the message requesting approval of the transaction;
receive a response to the message approving the transaction responded to by the controlling user using the computing device, the response including a cookie from the computing device;
perform a hash of the cookie;
determine a hash value of the cookie matches a stored hash value of a previous cookie that was received from the computing device;
map the hash value of the cookie and the payment identifier to the controlling user associated with the payment identifier based at least in part on determining that the hash value of the cookie matches the stored hash value of the previous cookie;
determine a setting is elected to automatically approve the transaction without requesting authentication information from the controlling user; and
automatically approve the transaction while refraining from sending a second request to the computing device to get the authentication information from the controlling user.

6. An apparatus as recited in claim 5, wherein automatically approving the transaction comprises approving the transaction without authenticating the controlling user associated with the payment identifier.

7. An apparatus as recited in claim 6, wherein authenticating comprises the controlling user associated with the payment identifier signing into an account using a user name or password.

8. An apparatus as recited in claim 5, wherein the payment identifier comprises a transaction phrase token comprising words selected by the controlling user as a way to perform transactions.

9. An apparatus as recited in claim 8, wherein the transaction phrase token is entered into a text box to conduct the transaction.

10. An apparatus as recited in claim 5, wherein the message comprises an email message.

11. An apparatus as recited in claim 5, wherein the message comprises an instant message.

12. An apparatus as recited in claim 5, further comprising providing the message in a web interface.

13. An apparatus as recited in claim 5, wherein the transmitting of the message to the controlling user associated with the payment identifier is on a channel different from a channel the first request to conduct the transaction is received on.

14. An apparatus as recited in claim 5, wherein the cookie is associated with a browser stored on the computing device.

15. A non-transitory storage device storing computer-executable instructions that, when executed on one or more processors, perform acts comprising:
receiving a first request to conduct a transaction initiated by a user, the first request including a payment identifier;
transmitting a message to a computing device associated with a controlling user associated with the payment identifier, the message including a second request for approval of the transaction;
receiving a response to the message approving the transaction responded to by the controlling user using the computing device and a cookie from the computing device;
performing a hash of the cookie;
determining a hash value of the cookie matches a stored hash value of a previous cookie that was received from the computing device;
mapping the hash value of the cookie and the payment identifier to the controlling user associated with the payment identifier based at least in part on determining that the hash value of the cookie matches the stored hash value of the previous cookie;
determining a setting is elected to automatically approve the transaction without requesting authentication information from the controlling user; and
automatically approving the transaction and refraining from sending, to the computing device, a third request to get the authentication information from the controlling user.

16. A non-transitory storage device as recited in claim 15, wherein the payment identifier comprises a transaction phrase token entered into a text box as a payment instrument to conduct the transaction.

17. A non-transitory storage device as recited in claim 15, wherein authentication information comprises a user name or password.

18. A non-transitory storage device as recited in claim 15, wherein the cookie is associated with a browser stored on the computing device.

19. A non-transitory storage device as recited in claim 15, wherein the previous cookie is associated with a browser stored on the computing device.

\* \* \* \* \*